(12) United States Patent
Yoshida et al.

(10) Patent No.: US 10,930,226 B2
(45) Date of Patent: Feb. 23, 2021

(54) LIQUID CRYSTAL DISPLAY DEVICE WITH TIME-DIVISION DRIVING

(71) Applicant: SHARP KABUSHIKI KAISHA, Sakai (JP)

(72) Inventors: Hidefumi Yoshida, Sakai (JP); Kazutaka Hanaoka, Sakai (JP); Takahiro Sasaki, Sakai (JP); Kimiaki Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/604,928

(22) PCT Filed: Apr. 17, 2018

(86) PCT No.: PCT/JP2018/015804
§ 371 (c)(1),
(2) Date: Oct. 11, 2019

(87) PCT Pub. No.: WO2018/198874
PCT Pub. Date: Nov. 1, 2018

(65) Prior Publication Data
US 2020/0160799 A1    May 21, 2020

(30) Foreign Application Priority Data
Apr. 24, 2017  (JP) .............................. JP2017-085593

(51) Int. Cl.
*G09G 3/34*    (2006.01)
*G09G 3/36*    (2006.01)

(52) U.S. Cl.
CPC ......... *G09G 3/3426* (2013.01); *G09G 3/3648* (2013.01); *G09G 2300/0408* (2013.01); *G09G 2300/0426* (2013.01); *G09G 2320/0666* (2013.01)

(58) Field of Classification Search
CPC .................................................. G09G 3/3426
See application file for complete search history.

(56) References Cited

U.S. PATENT DOCUMENTS

| | | | | |
|---|---|---|---|---|
| 4,842,371 A | * | 6/1989 | Yasuda ................ | G09G 3/3607 345/103 |
| 2003/0218586 A1 | * | 11/2003 | Wu ....................... | G09G 3/3648 345/87 |
| 2007/0030233 A1 | | 2/2007 | Chai et al. | |
| 2007/0057883 A1 | * | 3/2007 | Cho ..................... | G09G 3/3648 345/88 |

(Continued)

FOREIGN PATENT DOCUMENTS

JP    4579204 B2    11/2010

*Primary Examiner* — William Boddie
*Assistant Examiner* — Andrew B Schnirel
(74) *Attorney, Agent, or Firm* — ScienBiziP, P.C.

(57) ABSTRACT

A liquid crystal display device is manufactured at a low cost. In the liquid crystal display device, three sub-pixel electrodes are connected by inter-electrode connection portions to form one pixel electrode. One TFT is connected to the pixel electrode. A screen of a liquid crystal display panel is divided into n (n≥2) of areas. Gate signal lines G of each divided area are scanned simultaneously one line at a time in each divided area. A backlight device emits light after completion of the scanning of each divided area.

11 Claims, 18 Drawing Sheets

(56) References Cited

U.S. PATENT DOCUMENTS

| | | | | |
|---|---|---|---|---|
| 2007/0120810 A1* | 5/2007 | You | ............... | G09G 3/3666 345/103 |
| 2011/0248978 A1* | 10/2011 | Koyama | ............ | G09G 3/3426 345/211 |
| 2014/0125644 A1* | 5/2014 | Guo | ............... | G09G 3/3648 345/209 |
| 2016/0155400 A1* | 6/2016 | Namkung | ........... | G09G 3/3607 345/205 |

* cited by examiner

LIQUID CRYSTAL DISPLAY DEVICE WITH TIME-DIVISION DRIVING

TECHNICAL FIELD

The present invention relates to a liquid crystal display device, and in particular to a time-division driving type liquid crystal display device.

BACKGROUND ART

A liquid crystal display device using color filters (hereinafter simply referred to as CFs) has been widely used for various devices, for example, from a smartphone to a monitor and a large-sized liquid crystal TV.

The CFs are used in a conventional liquid crystal display device that is not the time-division driving type, and each pixel of the liquid crystal display device is divided into three colors, red, green, and blue (RGB). In each pixel, a red CF absorbs green and blue lights, a green CF absorbs blue and red lights, and a blue CF absorbs red and green lights. Therefore, the conventional liquid crystal display device described above has a problem that transmissivity is low as shown in FIG. 17 (in particular, as shown by description in lower left of FIG. 17). FIG. 17 is an explanatory diagram showing that transmissivity of FSD (Field Sequential Display) without color filter and transmissivity of a liquid crystal display with color filter are compared and the transmissivity of the latter is low.

On the other hand, under present circumstances, a time-division driving type liquid crystal display device is proposed and a social implementation experiment is performed so that the time-division driving type liquid crystal display device is used as a transparent display and the like. In this liquid crystal display device, a liquid crystal display panel is driven at a frequency higher than normal 60 Hz. Specifically, one scan time (16 ms=1000/60) is divided into three time periods, and an entire screen is scanned in the first time period. Thereafter, a red backlight is turned on over an entire surface. Further, the entire screen is scanned in the second time period, and thereafter, a green backlight is turned on over the entire surface. Furthermore, the entire screen is scanned in the third time period, and thereafter, a blue backlight is turned on over the entire surface. Thereby, red, green, and blue screens are combined and a full color display is performed. FIG. 18 is an explanatory diagram showing advantage and disadvantage of an FSC (Field Sequential Color) method used for the time-division driving type liquid crystal display device with respect to a CF method.

As shown in FIG. 18, the time-division driving type liquid crystal display device uses a liquid crystal display panel that switches at high speed and does not use CF. Therefore, light is not absorbed by CF, and bright display can be performed. Further, since no CF is used, light of a backlight device can be efficiently used for display as shown in FIG. 19, so that a low power consumption liquid crystal display device can be realized. FIG. 19 is an explanatory diagram showing power consumption of the FSC (Field Sequential Color) method and the CF method.

The time-division driving type liquid crystal display device does not use CF, so that transmissivity when the backlight device is turned off is high. Therefore, by using this advantage, a transparent type liquid crystal display device is proposed. The transparent type liquid crystal display device has high transparency even when the backlight device is turned off, so that it is possible to observe background of the liquid crystal display device. Further, the transparent type liquid crystal display device can perform color display when the backlight device is turned off.

In the time-division driving type liquid crystal display device, as described above, one frame 16 ms is divided into three time periods, a gate line is scanned every about 5.3 ms, and a predetermined signal is written to each pixel. Therefore, in the time-division driving type liquid crystal display device, when the number of lines is the same as that of the CF method, it is required to access each line in one-third time (5.3 ms=16 ms/3) than that of the CF method and charge electric charges to a liquid crystal layer. Therefore, a phenomenon occurs where charging of the liquid crystal layer cannot be performed in time.

Thus, to solve the above problem, in a configuration described in PTL1, a signal is written by simultaneously scanning three gate lines each time. Specifically, as shown in FIG. 20, three gate lines are bundled together, and a gate signal is written to the three gate lines at the same time. Therefore, one output of a gate driver handles three gate lines. FIG. 20 is a circuit diagram showing a configuration of a TFT substrate of a liquid crystal display device described in PTL1.

CITATION LIST

Patent Literature

PTL 1: Japanese Patent No. 4579204

SUMMARY OF INVENTION

Technical Problem

However, in a configuration where the gate driver drives three gate lines at the same time (see PTL1), an area where the gate lines are drawn around is three times that in a configuration where the gate driver drives one gate line at a time. Therefore, for example, to design a time-division driving type liquid crystal display device where the gate driver drives three gate lines at the same time, a large design change is required on a design of a liquid crystal display device where the gate driver drives one gate line at a time. Therefore, the time-division driving type liquid crystal display device needs to be manufactured by newly designing a mask, so that design cost increases.

On the other hand, demand for a transparent type liquid crystal display device that uses the time-division driving type liquid crystal display device is not so large. Therefore, each product, that is, the liquid crystal display device, has a problem that the cost of mask to be borne increases and the price of the liquid crystal display device also increases.

Therefore, an object of the present is to provide a liquid crystal display device whose design cost can be reduced and which can be manufactured at low cost.

Solution to Problem

To solve the above problem, a liquid crystal display device according to an aspect of the present invention includes a liquid crystal display panel having an active matrix substrate, and a backlight device. The backlight device emits red, green, and blue lights in a time division manner from its entire surface and a display of the liquid crystal display panel is switched in synchronization with the light emission, so that the liquid crystal display device performs color display. In the liquid crystal display device, one pixel is divided into three sub-pixels by source signal lines, there is a sub-pixel electrode for each of the three sub-pixels, a plurality of the sub-pixel electrodes corresponding to the one pixel are connected together by inter-electrode connection portions that cross the source signal lines in a non-connection state to form one pixel electrode, one switching element is connected to the pixel electrode so that a voltage can be applied from the source signal line to the pixel electrode, a screen of the liquid crystal display panel is divided into n (n≥2) areas in an arrangement direction of gate signal lines, the gate signal lines of each divided area are scanned simultaneously one line at a time in each divided area, and the backlight device emits light after completion of the scanning of the gate signal lines in each divided area.

Advantageous Effects of Invention

According to an aspect of the present invention, when designing a liquid crystal display device, it is possible to save design resources, reduce the number of masks whose designs are changed, and reduce design cost. As a result, it is possible to manufacture the liquid crystal display device at low cost.

DESCRIPTION OF EMBODIMENTS

First Embodiment

An embodiment of the present invention will be described below with reference to the drawings.

(Overview of Liquid Crystal Display Device 1)

Figure 1:
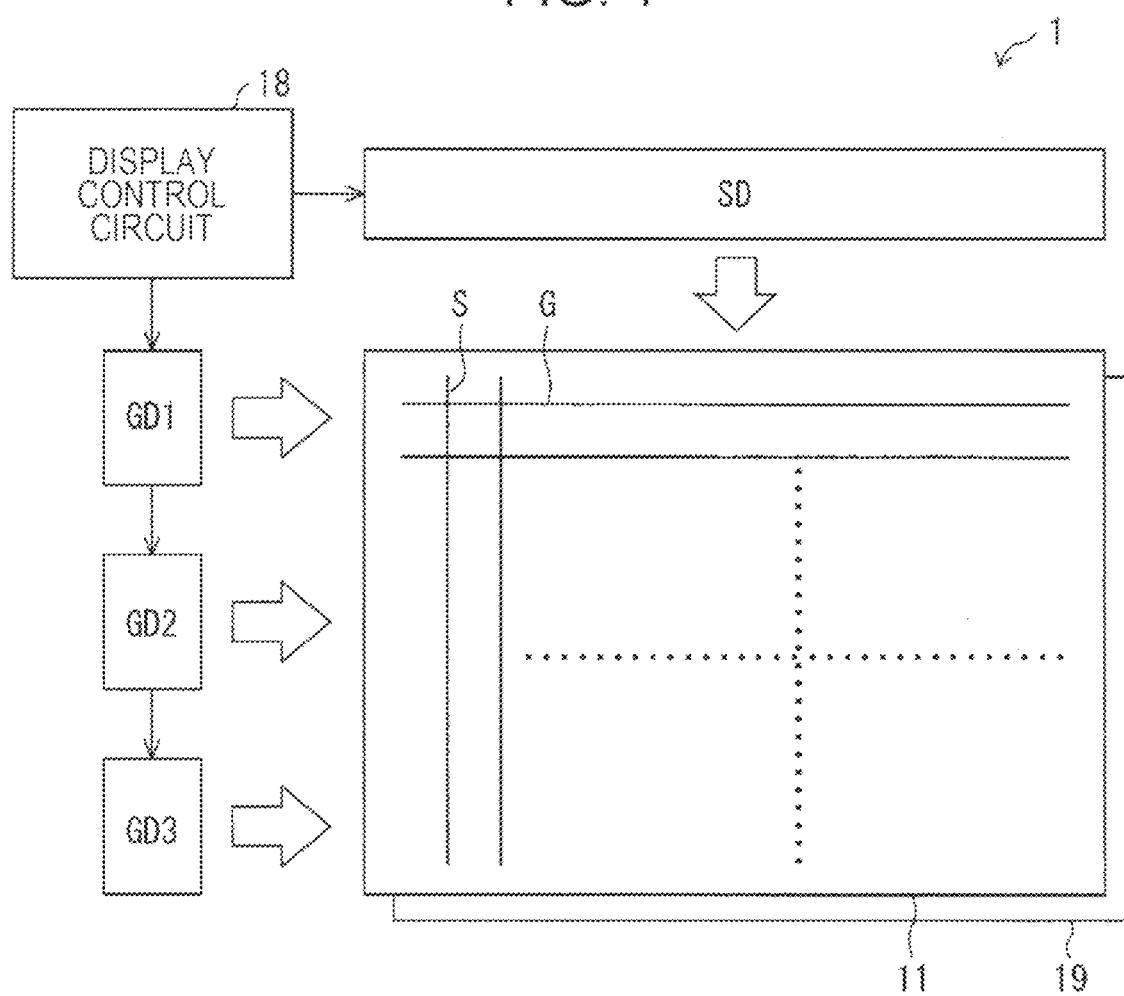
FIG. 1 is a schematic block diagram showing a configuration of a liquid crystal display device of an embodiment of the present invention.
Figure 2:
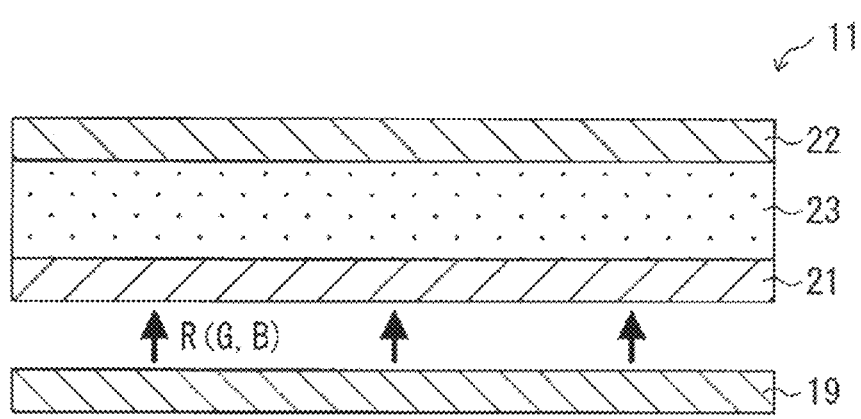
FIG. 2 is a schematic vertical cross-sectional view of a liquid crystal display panel included in the liquid crystal display device shown in FIG. 1.

FIG. 1 is a schematic block diagram showing a configuration of a liquid crystal display device of the present embodiment. FIG. 2 is a schematic vertical cross-sectional view of a liquid crystal display panel included in the liquid crystal display device shown in FIG. 1.

As shown in FIG. 1, a liquid crystal display device 1 includes a liquid crystal display panel 11, a source driver SD, a gate driver GD (GD1 to GD3), a display control circuit 18, and a backlight device 19. As shown in FIG. 1, the gate driver GD is generally composed of a plurality of gate drivers GD (gate driver GD elements). In the example of FIG. 1, the gate driver GD is composed of three gate drivers GD1 to GD3. In this case, when a scan signal is transmitted from a first row to a last row in one gate driver GD, information indicating this fact is delivered to a next stage gate driver GD, and the next stage gate driver GD transmits the scan signal in the same manner.

The liquid crystal display panel 11 has source signal lines S and gate signal lines G which are provided in a matrix form. In the liquid crystal display panel 11, as shown in FIG. 2, a TFT substrate (active matrix substrate) 21 and a counter substrate 22 are arranged to face each other. A liquid crystal layer 23 is provided between the TFT substrate 21 and the counter substrate 22.

The source driver SD drives the source signal lines S of the liquid crystal display panel 11, and the gate driver GD drives the gate signal lines G of the liquid crystal display panel 11. The display control circuit 18 outputs a control signal instructing the gate driver GD to scan the gate signal lines G to the gate driver GD and outputs a clock signal, a start pulse signal, video data, and the like to the source driver SD based on a control signal and display data supplied from outside.

The start pulse outputted from the display control circuit 18 is inputted into only the gate driver GD1, thereafter, the start pulse is inputted into the gate driver GD2 from the gate driver GD1, and the start pulse is inputted into the gate driver GD3 from the gate driver GD2.

The backlight device 19 irradiates the liquid crystal display panel 11 with light from a back surface of the liquid crystal display panel 11 while switching lights of red, green, and blue. Although the backlight device 19 may irradiate the liquid crystal display panel 11 with light while switching white light in addition to the lights of red, green, and blue, the backlight device 19 irradiates the liquid crystal display panel 11 with light while switching at least the lights of red, green, and blue. In the description below, for convenience of description, it is assumed that the backlight device 19 irradiates the liquid crystal display panel 11 with light while switching lights of red, green, and blue.

(Configuration of Liquid Crystal Display Panel 11)

Figure 3:
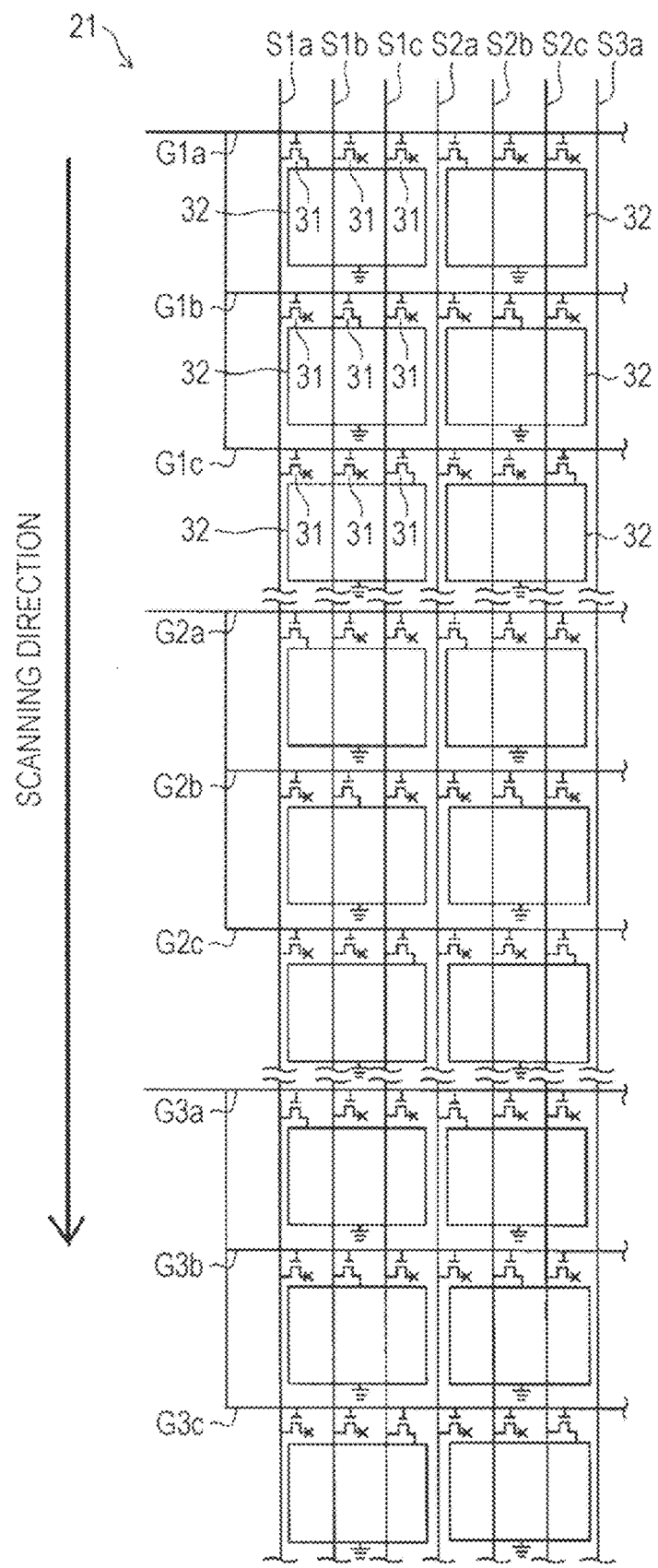
FIG. 3 is a schematic circuit diagram showing a configuration of a TFT substrate shown in FIG. 2.

FIG. 3 is a schematic circuit diagram showing a configuration of the TFT substrate 21 shown in FIG. 2. The TFT substrate 21 is designed by using a design of a conventional TFT substrate of a liquid crystal display panel including a color filter. In the conventional TFT substrate, each pixel included in each row is divided into three sub-pixels for red, green, and blue.

The TFT substrate 21 has source signal lines S1a to S1c, S2a to S2c, and so on, which are first to third source signal lines corresponding to the three sub-pixels for red, green, and blue, respectively.

Further, in the TFT substrate 21, regarding gate signal lines G1a, G1b, and G1c and so on which are scanned by the gate driver GD1, the continuous three gate signal lines G1a to G1c and so on are connected to each other so as to be simultaneously scanned by the gate driver GD1. The same goes for gate signal lines G2a, G2b, and G2c and so on which are scanned by the gate driver GD2 and gate signal lines G3a, G3b, and G3c and so on which are scanned by the gate driver GD3. That is to say, the gate signal lines G2a to G2c and so on are connected to each other, and in the same manner, the gate signal lines G3a to G3c and so on are connected to each other.

Here, the number of gate signal lines G that are simultaneously driven is three. However, it is needless to say that two or more gate signal lines G can be driven by the same principle.

The TFT substrate 21 has one pixel electrode 32 that covers an area of the above-mentioned three sub-pixels for each set of the above-mentioned three sub-pixels. Further, the TFT substrate 21 has a TFT (switching element) 31 for each of the above-mentioned three sub-pixels, that is, for each of the first to the third source signal lines.

Next, a connection relationship among the source signal lines S, the TFTs 31, and the pixel electrodes 32 in continuous three rows will be described by using the pixel electrodes 32 of a first column on the left side as an example. In the first row of the continuous three rows, only the source signal line S1a of the source signal lines S1a to S1c is connected to the pixel electrode 32 through the TFT 31, in the second row, only the source signal line S1b is connected to the pixel electrode 32 through the TFT 31, and in the third row, only the source signal line S1c is connected to the pixel electrode 32 through the TFT 31. In FIG. 3, a mark x given to the TFT 31 indicates a state (non-connection state) that the TFT 31 is not connected to the pixel electrode 32.

(Substantive Configuration of TFT Substrate 21)

Figure 4:
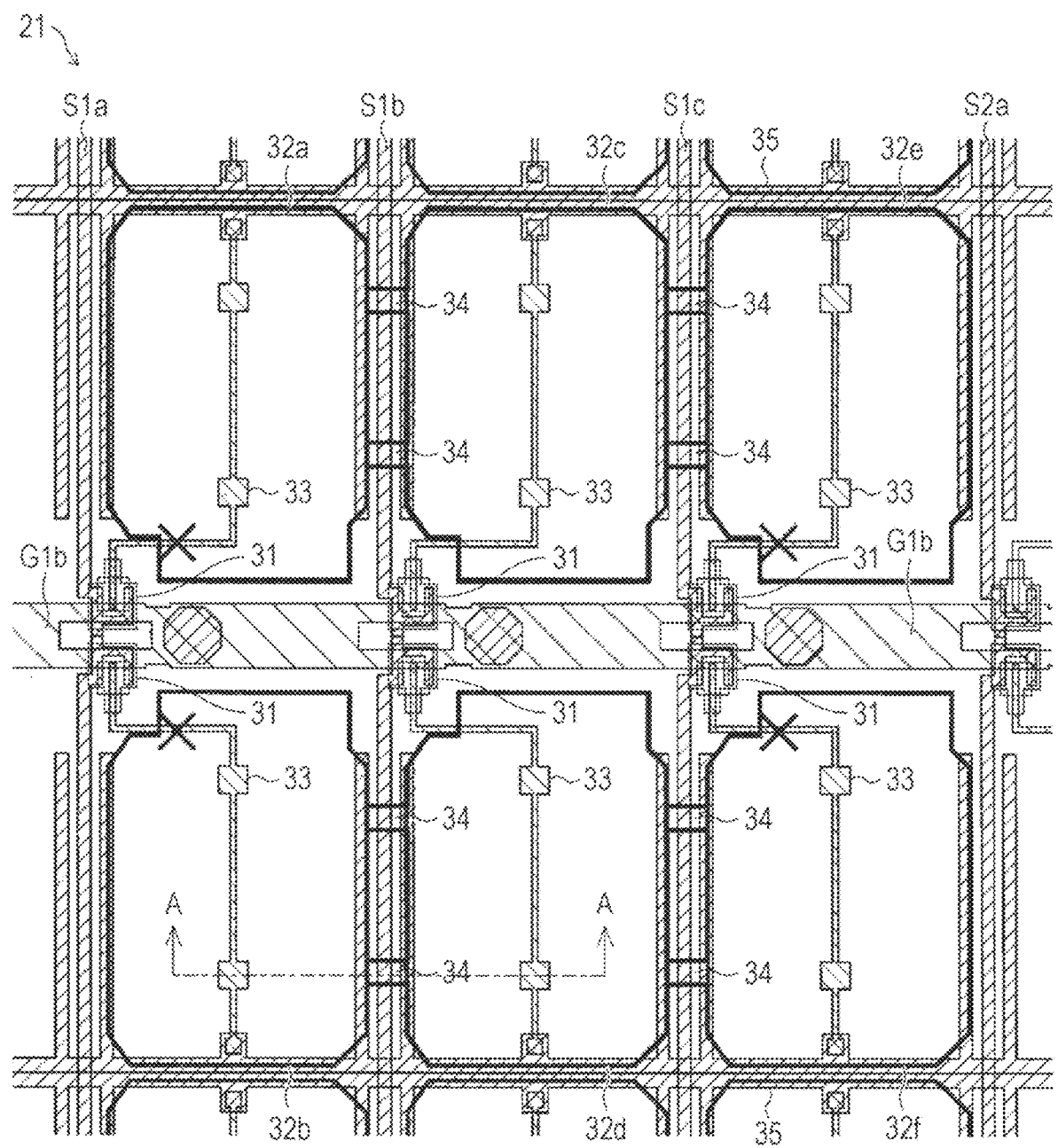
FIG. 4 is a plan view showing an example of a substantive configuration of the TFT substrate shown in FIG. 3.
Figure 5:
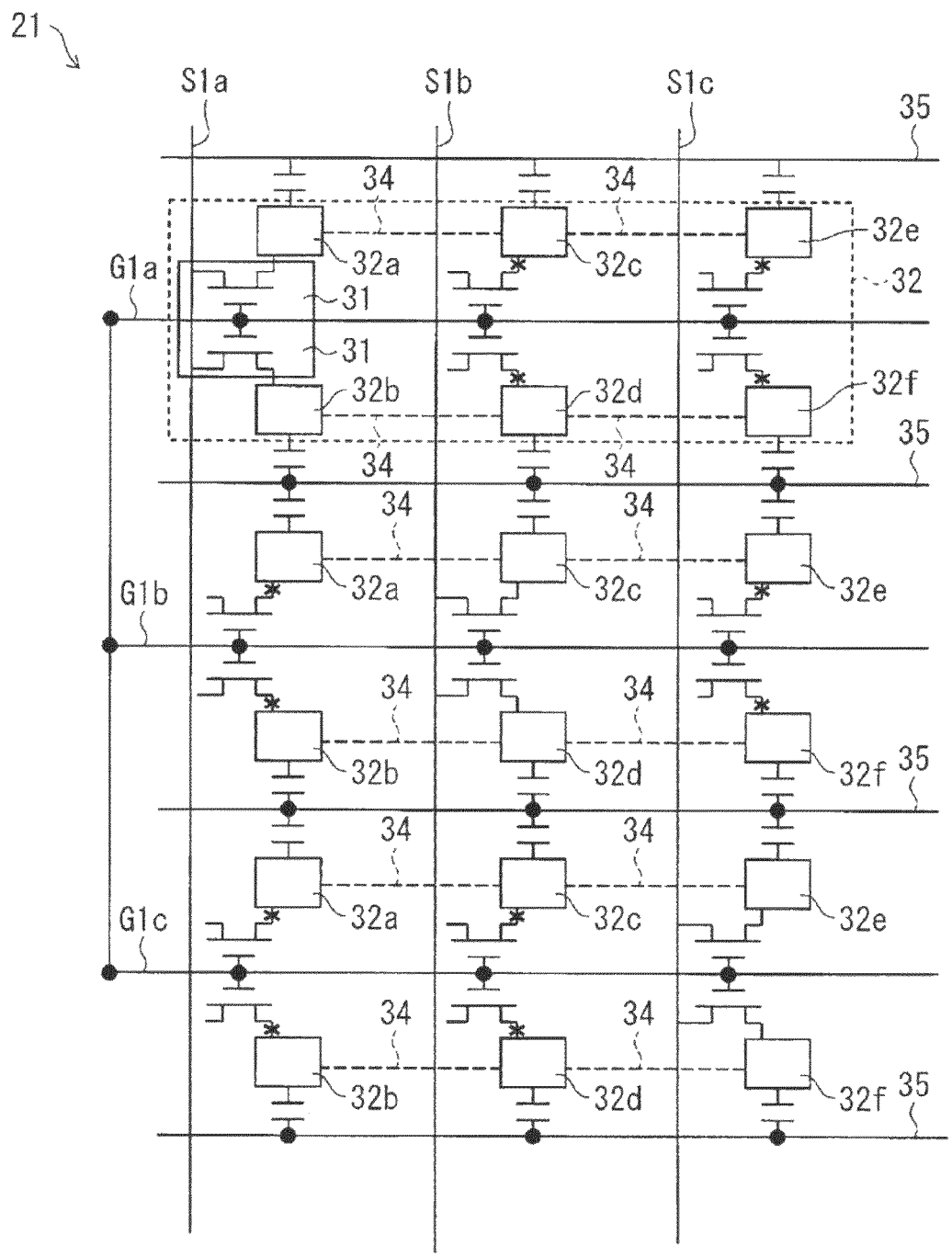
FIG. 5 is a circuit diagram corresponding to the circuit diagram of the TFT substrate shown in FIG. 3 based on the configuration shown in FIG. 4.

Next, a substantive configuration of the TFT substrate 21 shown in FIG. 3 will be described with reference to FIG. 4. FIG. 4 is a plan view showing an example of the substantive configuration of the TFT substrate 21 shown in FIG. 3. FIG. 5 is a circuit diagram corresponding to the circuit diagram of the TFT substrate 21 shown in FIG. 3 based on the configuration shown in FIG. 4. The configuration shown in FIG. 4 corresponds to a portion of the pixel electrode 32 in the second row on the left side column in FIG. 3.

As shown in FIG. 4, the TFT substrate 21 has ITO (Indium Tin Oxide) electrodes 32a to 32f forming the pixel electrode 32. The six ITO electrodes (sub-pixel electrodes) 32a to 32f forms one pixel (one pixel electrode 32) in time-division driving of the liquid crystal display device 1. The upper and lower two ITO electrodes 32a and 32b on the left side correspond to a red sub-pixel of a conventional TFT substrate, the upper and lower two ITO electrodes 32c and 32d in the central portion correspond to a green sub-pixel of a conventional TFT substrate, and the upper and lower two ITO electrodes 32e and 32f on the right side correspond to a blue sub-pixel of a conventional TFT substrate.

The ITO electrode 32c is connected to the left side ITO electrode 32a and the right side ITO electrode 32e by two inter-electrode connection portions 34, respectively. The inter-electrode connection portions 34 straddle over the source signal lines S1b and S1c (cross the source signal lines S1b and S1c in a non-connection state). In the TFT substrate 21, the yield is improved by providing the inter-electrode connection portion 34 in two locations. The inter-electrode connection portion 34 is provided only in partial areas between the ITO electrode 32c and the ITO electrode 32a and between the ITO electrode 32c and the ITO electrode 32e. Thereby, overlaps between the pixel electrode 32 and the source signal lines S1b and S1c are suppressed to minimum.

In this way, it is desirable that the area where the pixel electrode 32, that is, the inter-electrode connection portions 34, and the source signal lines (the source signal lines S1b and S1c) are overlapped is as small as possible. This is to suppress variation of potential of a source signal, that is, variation of potential of the pixel electrode 32, which is caused by capacitive coupling between the pixel electrode 32 and the source signal lines (the source signal lines S1b and S1c).

A configuration where adjacent ITO electrodes are connected by the inter-electrode connection portions 34 can also be applied to liquid crystal display devices of all the other embodiments in the same manner.

In the same manner, the ITO electrode 32d is connected to the left side ITO electrode 32b and the right side ITO electrode 32f.

The TFT 31 and the pixel electrode 32 are connected by a contact hole 33. In the example shown in FIG. 4, only the ITO electrodes 32c and 32d are in a connection state with the TFT 31, and the ITO electrodes 32a and 32b and the ITO electrodes 32e and 32r are in a non-connection state with the TFT 31. In this state, a signal of the source signal line S (the source signal line S1b) is given to only the ITO electrodes 32c and 32d from the TFT 31 corresponding to the ITO electrodes 32c and 32d. Reference numeral 35 indicates a CS line.

In the example of FIG. 4, the non-connection state between the TFT 31 and the pixel electrode 32 is realized by disconnecting the source electrode (or the drain electrode) of the TFT 31 between the TFT 31 and the contact hole 33 (mark x in FIG. 4). In this case, it is possible to easily cope with the presence or absence of voltage application to the ITO electrode by only changing a pattern of the source electrode (or the drain electrode). The non-connection state between the TFT 31 and the pixel electrode 32 may be realized by eliminating a pattern of the ITO electrode that makes non-connection state with the TFT 31.

Next, a connection relationship among the source signal lines S, the gate signal lines G, the TFTs 31, and the ITO electrodes (sub-pixel electrodes) 32 described above will be described in more detail with reference to FIG. 5.

As shown in FIG. 5, in the TFT substrate 21 using a conventional design, the TFT 31 is formed for all the sub-pixels.

Among the TFTs 31 connected to the gate signal line G1a, two TFTs 31 whose original purpose is to transmit a signal of the source signal line S1a to the ITO electrodes (sub-pixel electrodes) 32a and 32b accomplish the original purpose (the two TFTs 31 are used according to the original purpose). Specifically, regarding the two TFTs 31, the source electrode is connected to the source signal line S1a, and the drain electrode is connected to the ITO electrode 32a or 32b.

On the other hand, among the TFTs 31 connected to the gate signal line G1a, two TFTs 31 whose original purpose is to transmit a signal of the source signal line S1b to the ITO electrodes (sub-pixel electrodes) 32c and 32d and two TFTs 31 whose original purpose is to transmit a signal of the source signal line S1c to the ITO electrodes (sub-pixel electrodes) 32e and 32f do not accomplish the original purpose (the four TFTs 31 are not used according to the original purpose). Specifically, regarding the two TFTs 31 whose original purpose is to transmit a signal of the source signal line S1b to the ITO electrodes (sub-pixel electrodes) 32c and 32d, the source electrodes are disconnected from the source signal line S1b and the drain electrodes are disconnected from the ITO electrodes 32c or 32d. Similarly, regarding the two TFTs 31 whose original purpose is to transmit a signal of the source signal line S1c to the ITO electrodes (sub-pixel electrodes) 32e and 32f, the source electrodes are disconnected from the source signal line S1c and the drain electrodes are disconnected from the ITO electrodes 32e or 32f.

Among the TFTs 31 connected to the gate signal line G1b, two TFTs 31 whose original purpose is to transmit a signal of the source signal line S1b to the ITO electrodes (sub-pixel electrodes) 32c and 32d accomplish the original purpose (the two TFTs 31 are used according to the original purpose). The states of the two TFTs 31 corresponding to the ITO electrodes 32c and 32d in this case are the same as the states of the two TFTs 31 corresponding to the ITO electrodes 32a and 32b among the TFTs 31 connected to the gate signal line G1a.

On the other hand, among the TFTs 31 connected to the gate signal line G1b, two TFTs 31 whose original purpose is to transmit a signal of the source signal line S1a to the ITO electrodes 32a and 32b and two TFTs 31 whose original purpose is to transmit a signal of the source signal line S1c to the ITO electrodes 32e and 32f do not accomplish the original purpose (the four TFTs 31 are not used according to the original purpose). The states of the two TFTs 31 corresponding to the ITO electrodes 32a and 32b and the states of the two TFTs 31 corresponding to the ITO electrodes 32e and 32f in this case are the same as the states of, for example, the two TFTs 31 corresponding to the ITO electrodes 32c and 32d among the TFTs 31 connected to the gate signal line G1a.

Among the TFTs 31 connected to the gate signal line G1c, two TFTs 31 whose original purpose is to transmit a signal of the source signal line S1c to the ITO electrodes (sub-pixel electrodes) 32e and 32f accomplish the original purpose (the two TFTs 31 are used according to the original purpose). The states of the two TFTs 31 corresponding to the ITO electrodes 32e and 32f in this case are the same as the states of the two TFTs 31 corresponding to the ITO electrodes 32a and 32b among the TFTs 31 connected to the gate signal line G1a.

On the other hand, among the TFTs 31 connected to the gate signal line G1c, two TFTs 31 whose original purpose is to transmit a signal of the source signal line S1a to the ITO electrodes 32a and 32b and two TFTs 31 whose original purpose is to transmit a signal of the source signal line S1b to the ITO electrodes 32c and 32d do not accomplish the original purpose (the four TFTs 31 are not used according to the original purpose). The states of the two TFTs 31 corresponding to the ITO electrodes 32a and 32b and the states of the two TFTs 31 corresponding to the ITO electrodes 32c and 32d in this case are the same as the states of, for example, the two TFTs 31 corresponding to the ITO electrodes 32c and 32d among the TFTs 31 connected to the gate signal line G1a.

In the TFT substrate 21, the connection relationship among the source signal lines S, the gate signal lines G, the TFTs 31, and the ITO electrodes 32 as described above is repeated.

(Operation and Advantage of Liquid Crystal Display Device 1)

In the configuration described above, the liquid crystal display device 1 performs the same operation as that of a conventional time-division driving type liquid crystal display device which performs color display while the backlight device 19 emits RGB lights in a time division manner. Specifically, in the liquid crystal display device 1, the backlight device 19 emits RGB lights in a time division manner from its entire surface and a display of the liquid crystal display panel 11 is switched in synchronization with the light emission, so that the liquid crystal display device 1 performs color display.

The liquid crystal display device 1 uses a design of an existing liquid crystal display panel that uses a color filter, in particular a design for a pixel portion. Therefore, in the liquid crystal display device 1, it is required to only change, for example, a design of the ITO electrode for applying a voltage in a pixel area. Thereby, the liquid crystal display device 1 can save design resources, reduce the number of masks whose designs are changed, and reduce design cost. As a result, the liquid crystal display device 1 can be manufactured at low cost. Of course, if the structure is the same, it is needless to say that the liquid crystal display device 1 can be newly designed.

In the present embodiment, a case is shown where three gate signal lines G are connected together to be one unit gate signal line and a gate voltage is applied from the gate driver GD for each one unit gate signal line. However, m (m≥2) gate signal lines G may be connected together to be one unit gate signal line.

Second Embodiment

Another embodiment of the present invention will be described below with reference to the drawings. For convenience of description, members having the same functions as those of members described in the above embodiment are denoted by the same reference signs and the description thereof will be omitted.

(Overview of Liquid Crystal Display Device 2)

Figure 6:
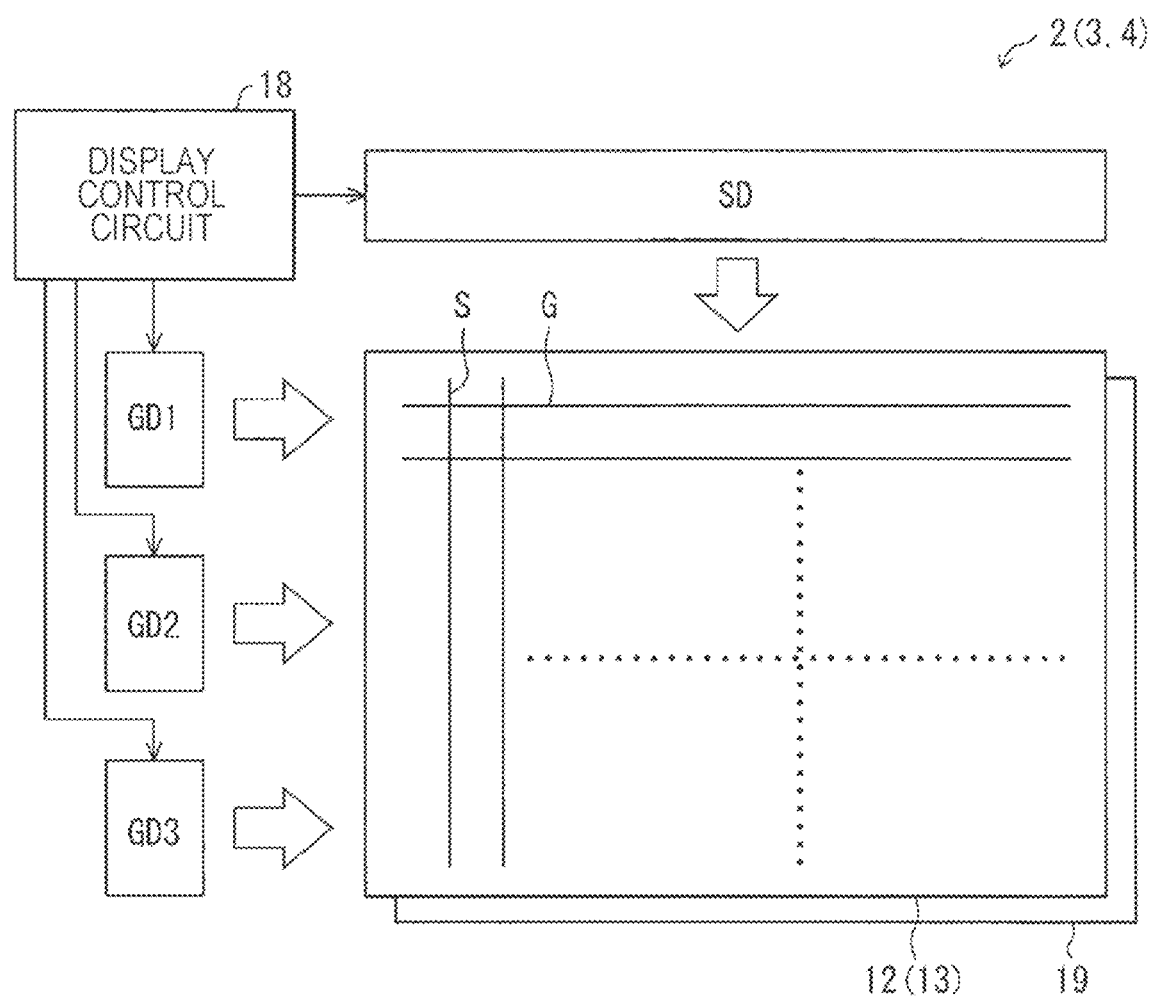
FIG. 6 is a schematic block diagram showing a configuration of a liquid crystal display device of an embodiment of the present invention.

FIG. 6 is a schematic block diagram showing a configuration of a liquid crystal display device 2 of the present embodiment. As shown in FIG. 6, the liquid crystal display device 2 includes a liquid crystal display panel 12 instead of the liquid crystal display panel 11 of the liquid crystal display device 1.

In the liquid crystal display device 1 described above, the start pulse outputted from the display control circuit 18 is inputted into only the gate driver GD1, and the start pulse is sequentially inputted from the gate driver GD1 to the gate driver GD2 and from the gate driver GD2 to the gate driver GD3. On the other hand, in the liquid crystal display device 2, the start pulse outputted from the display control circuit 18 is inputted into each of the gate drivers GD1 to GD3.

(Configuration of Liquid Crystal Display Panel 12)

Figure 7:
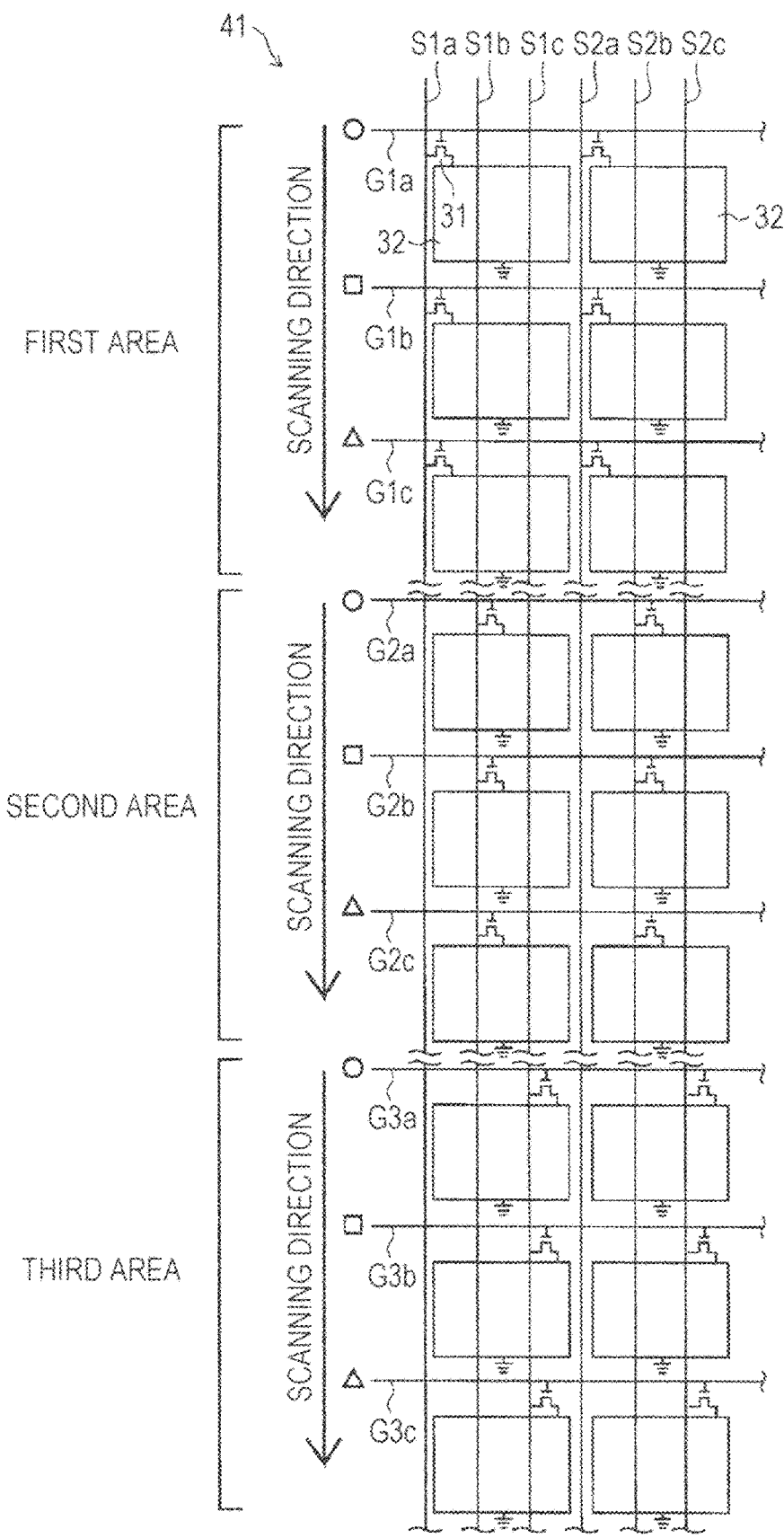
FIG. 7 is a schematic circuit diagram showing a configuration of a TFT substrate included in a liquid crystal display panel shown in FIG. 6.

FIG. 7 is a schematic circuit diagram showing a configuration of a TFT substrate 41 included in the liquid crystal display panel 12. The TFT substrate (active matrix substrate) 41 is designed by using a design of a conventional TFT substrate of a liquid crystal display panel including a color filter in the same manner as the TFT substrate 21.

However, in the TFT substrate 41, as shown in FIG. 7, the TFT 31 is not formed for each sub-pixel, and only the TFT 31 that applies a voltage to the pixel electrode 32 composed of a plurality of sub-pixels is formed. In this case, regarding the TFT 31 that is formed for each sub-pixel by using a design of a conventional TFT substrate, unnecessary TFTs 31 are removed by etching and only necessary TFTs 31 are left. In other words, the TFT substrate 41 having such a configuration can use a design of a conventional TFT substrate (a conventional pixel design or a conventional TFT design). In the conventional TFT substrate, each pixel included in each row is divided into three sub-pixels for red, green, and blue.

In the same manner as the TFT substrate 21, the TFT substrate 41 has source signal lines S1a to S1c, S2a to S2c, and so on, which are first to third source signal lines corresponding to the three sub-pixels for red, green, and blue, respectively.

Further, in the same manner as the TFT substrate 21, the TFT substrate 41 has one pixel electrode 32 that covers an area of the above-mentioned three sub-pixels for each set of the above-mentioned three sub-pixels.

Different from the TFT substrate 21, the TFT substrate 41 has the gate signal lines G1a to G1c and so on in an upper one third area (hereinafter referred to as a first area) of a screen of the liquid crystal display panel 12, the gate signal lines G2a to G2c and so on in a central one third area (hereinafter referred to as a second area) of the screen of the liquid crystal display panel 12, and the gate signal lines G3a to G3c and so on in a lower one third area (hereinafter referred to as a third area) of the screen of the liquid crystal display panel 12.

The liquid crystal display panel 12 scans the gate signal lines G1a to G1c and so on in the first area by the gate driver GD1, scans the gate signal lines G2a to G2c and so on in the second area by the gate driver GD2, and scans the gate signal lines G3a to G3c and so on in the third area by the gate driver GD3. Scanning directions of the gate signal lines G in the first to the third areas are a downward direction on the screen. In this case, the scans of the gate signal lines G by the gate drivers GD1 to GD3 are started at the same time and performed in parallel.

Next, a connection relationship among the source signal lines S, the TFTs 31, and the pixel electrodes 32 in the first to the third areas will be described by using the pixel electrodes 32 of the first column on the left side as an example.

In the first area, only the source signal line S1a of the source signal lines S1a to S1c is connected to the pixel electrodes 32 through the TFTs 31, in the second area, only the source signal line S1b is connected to the pixel electrodes 32 through the TFTs 31, and in the third area, only the source signal line S1c is connected to the pixel electrodes 32 through the TFTs 31.

(Substantive Configuration of TFT Substrate 41)

Figure 8:
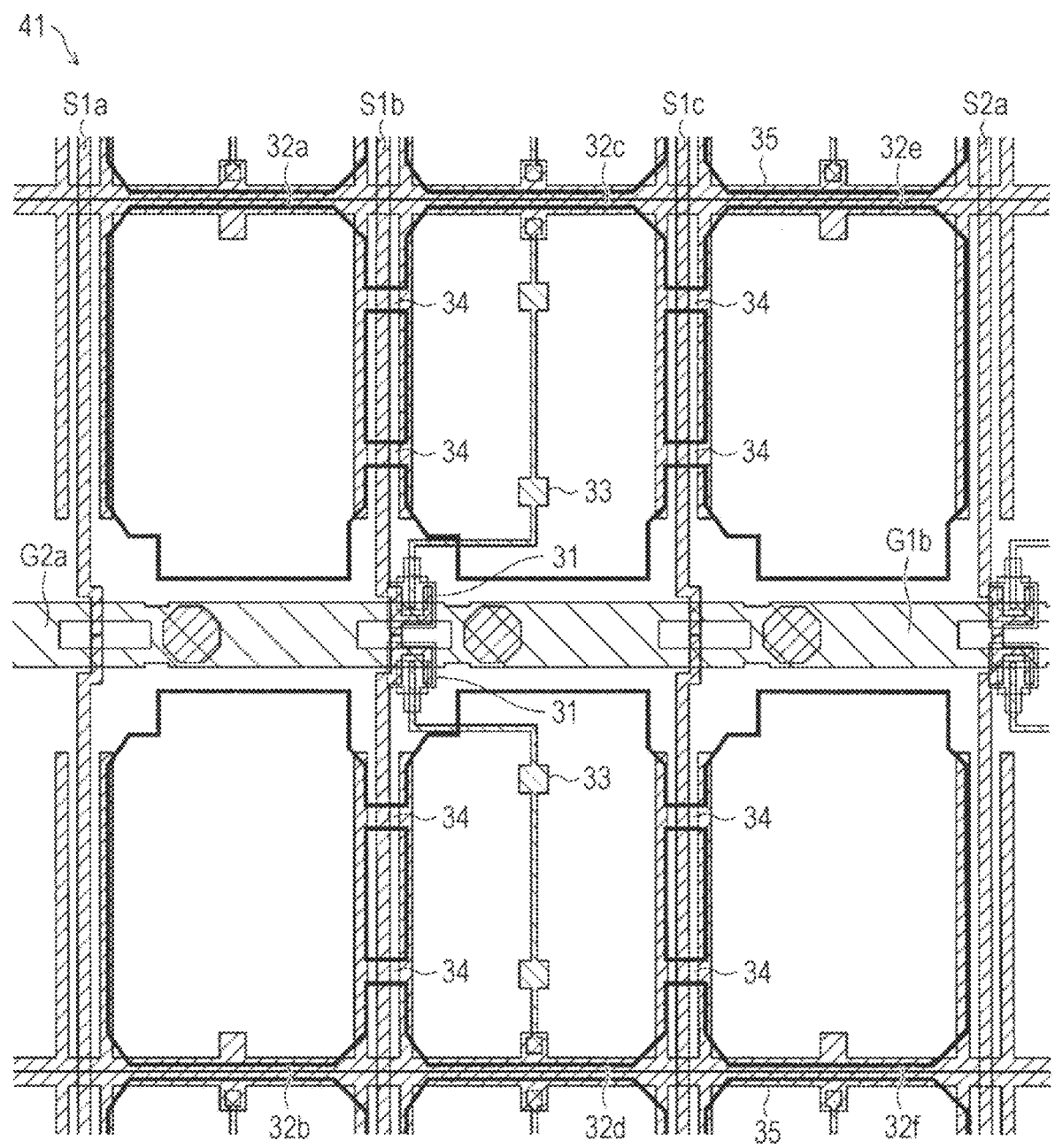
FIG. 8 is a plan view showing an example of a substantive configuration of the TFT substrate shown in FIG. 7.
Figure 9:
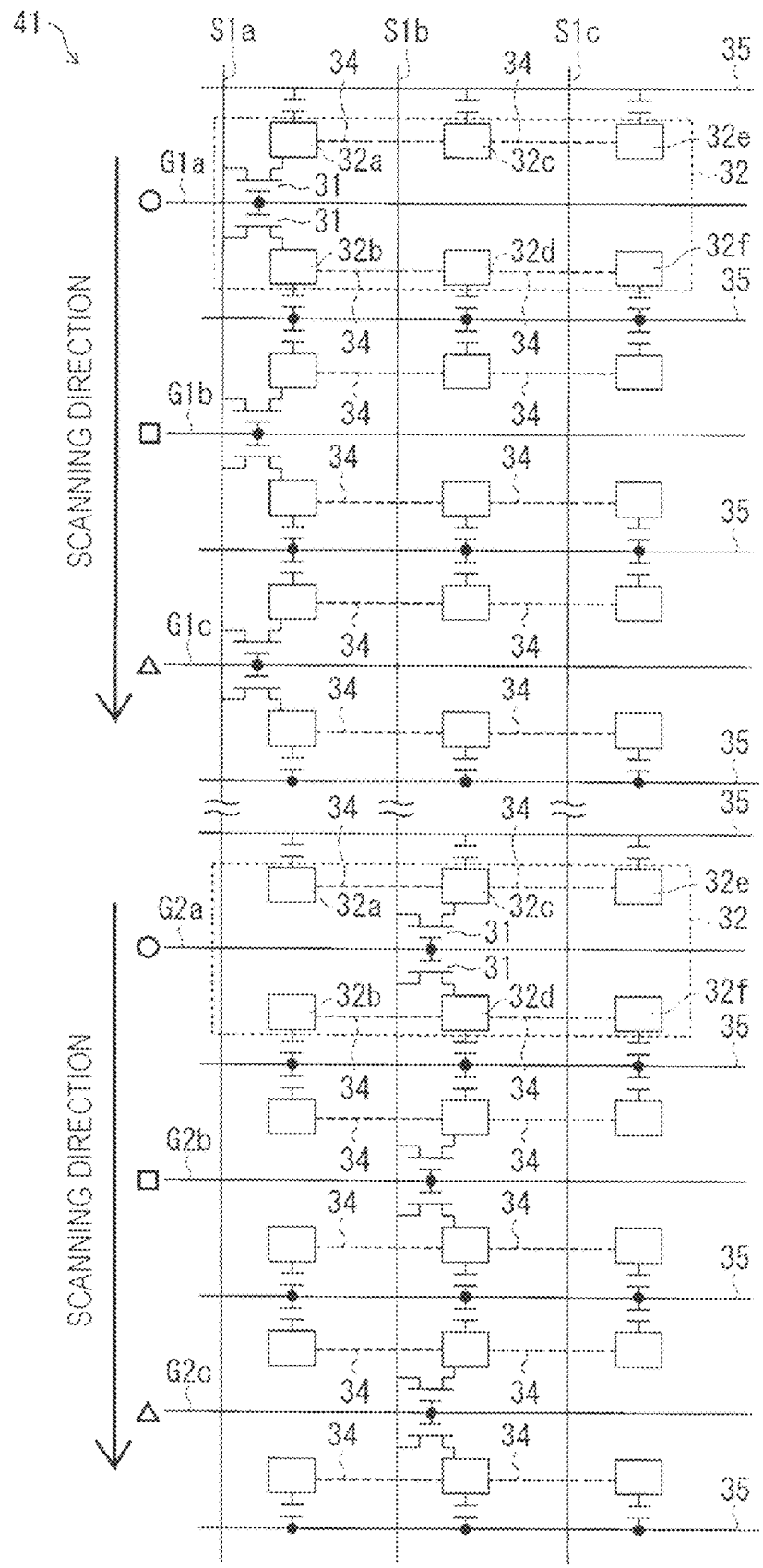
FIG. 9 is a circuit diagram corresponding to the circuit diagram of the TFT substrate shown in FIG. 7 based on the configuration shown in FIG. 8.

Next, a substantive configuration of the TFT substrate 41 shown in FIG. 7 will be described with reference to FIG. 8. FIG. 8 is a plan view showing an example of the substantive configuration of the TFT substrate 41 shown in FIG. 7. FIG. 9 is a circuit diagram corresponding to the circuit diagram of the TFT substrate 41 shown in FIG. 7 based on the configuration shown in FIG. 8. The configuration shown in FIG. 8 corresponds to a portion of the pixel electrode 32 in the first row on the left side column in the second area in FIG. 7.

As shown in FIG. 8, the TFT substrate 41 has the ITO electrodes 32a to 32f forming one pixel electrode 32 in the same manner as the TFT substrate 21. The configuration of the pixel electrode 32 is the same as that of the TFT substrate 21. The TFT 31 and the pixel electrode 32 are connected by the contact hole 33.

Figure 10:
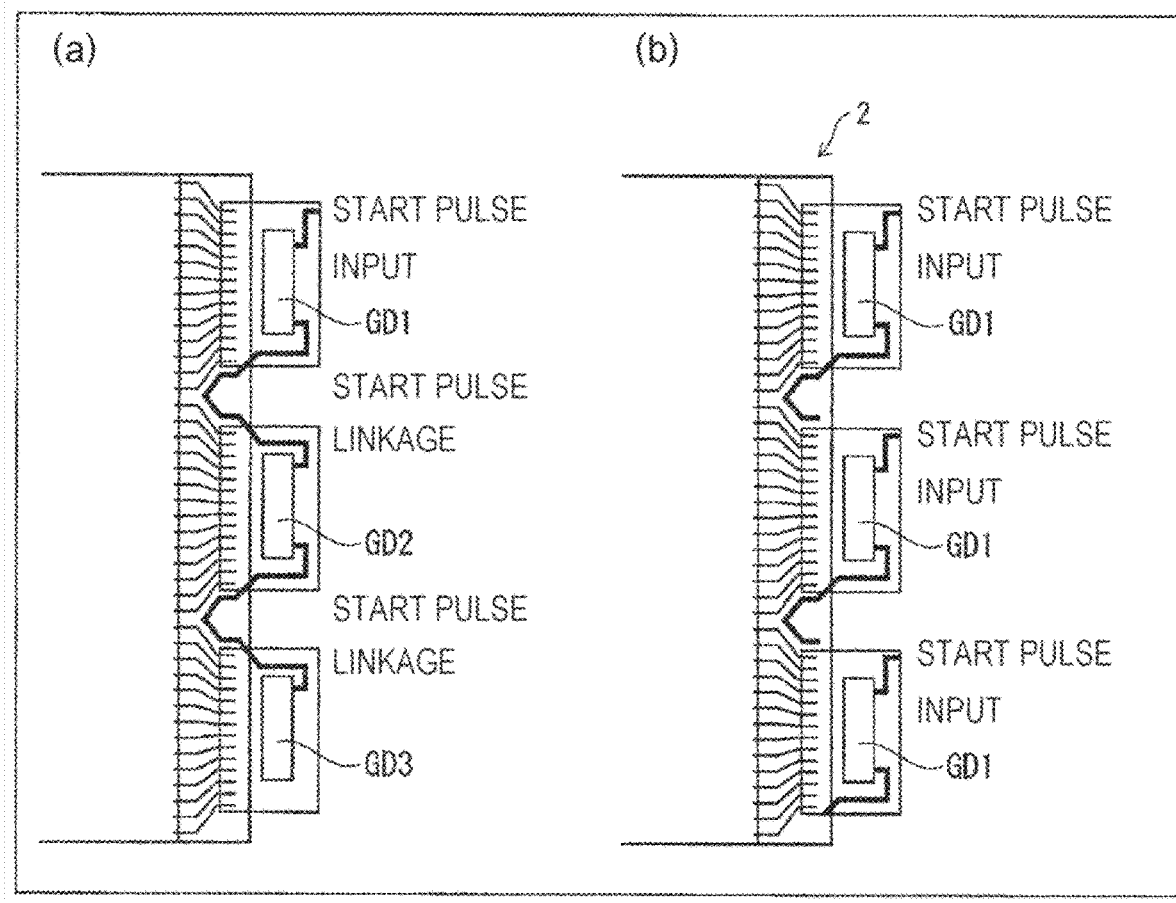
FIG. 10(a) is an explanatory diagram showing a configuration of a connection portion between gate drivers using COF and a liquid crystal display panel in a conventional liquid crystal display device using CF.
FIG. 10(b) is an explanatory diagram showing a configuration of a connection portion between gate drivers using COF and the liquid crystal display panel in the liquid crystal display device shown in FIG. 6.

Next, a configuration of a connection portion between the gate drivers GD1 to GD3 using COF (Chip On Film) and the liquid crystal display panel 12 will be described. FIG. 10(a) is an explanatory diagram showing a configuration of a connection portion between the gate drivers GD1 to GD3 using COF (Chip On Film) and a liquid crystal display panel in a conventional liquid crystal display device using CF. FIG. 10(b) is an explanatory diagram showing a configuration of a connection portion between the gate drivers GD1 to GD3 using COF and the liquid crystal display panel 12 in the liquid crystal display device 2 of the present embodiment.

As shown in FIG. 10(a), in the liquid crystal display device using CF, lines from the first line to the last line are sequentially scanned. Specifically, when a start pulse is inputted into the gate driver GD1 from the display control circuit 18, the gate driver GD1 starts scanning. When the gate driver GD1 ends the scanning, a signal for starting scanning is outputted from the gate driver GD1 to the gate driver GD2. Thereby, the gate driver GD2 starts scanning. When the gate driver GD2 ends the scanning, the gate driver GD3 starts scanning in the same manner.

On the other hand, in the liquid crystal display device 2 of the present embodiment, the gate drivers GD1 to GD3 simultaneously scan the first to the third areas in parallel by using the COF included in a conventional liquid crystal display device or a design of the COF. Specifically, start pulses are simultaneously inputted into the gate drivers GD1 to GD3 from the display control circuit 18 (see FIG. 10(b)). Regarding a film of the COF, a connection between a film of a first COF and a film of a second COF and a connection between the film of the second COF and a film of a third COF are disconnected, so that these films are independent from each other. Of course, the film of the COF is not limited to the configuration described above, and it is needless to say that a COF film having the same function can be newly designed.

(Operation and Advantage of Liquid Crystal Display Device 2)

In the configuration described above, the liquid crystal display device 2 performs color display while the backlight device 19 emits RGB lights in a time division manner in the same manner as the liquid crystal display device 1.

In the liquid crystal display device 2, the screen is vertically divided into the first to the third areas, and these areas are scanned by individual gate drivers GD1 to GD3, respectively, in parallel. Therefore, while the liquid crystal display device 2 is driven at 180 Hz and one frame time is 5.3 ms, the number of lines written by each source signal line S is one-third. Thereby, a writing time for one source signal line S can be 60 Hz in the same manner as in the case of 60 Hz driving, so that it is possible to sufficiently charge electric charges to the liquid crystal layer 23.

Here, a time for completing response of liquid crystal is appropriately set before emitting each light of red, green, and blue.

Each output terminal of each of the gate drivers GD1 to GD3 (for example, each of 256 output terminals included in each of the gate drivers GD1 to GD3) applies a voltage to only one gate signal line G and supplies current to the gate signal line G. A relationship between the gate drivers GD1 to GD3 and the gate signal line G is the same as that of a conventional CF type liquid crystal display device driven at 60 Hz.

As a result, the load of each of the gate drivers GD1 to GD3 is one-third of the load of each of the gate drivers GD1 to GD3 of the liquid crystal display device 1 (see FIG. 1) including the TFT substrate 21 (see FIG. 3).

Therefore, in the liquid crystal display device 2 of the present embodiment, the load of each of the gate drivers GD1 to GD3 is light in the same manner as in the conventional CF type liquid crystal display device driven at 60 Hz. Thereby, an existing gate driver driven at 60 Hz can be used for each of the gate drivers GD1 to GD3.

An existing design rule can be used for the gate drivers GD1 to GD3 and the like, so that a new design is not particularly required. Therefore, it is possible to realize a large-sized transparent type liquid crystal display panel 12 at low cost and minimum man-hours by only a minute design change by using a design for an existing TV.

Further, the liquid crystal display device 2 of the present embodiment uses a design of an existing liquid crystal display panel that uses a color filter, in particular a design for a pixel portion, in the same manner as the liquid crystal display device 1. Specifically, for the liquid crystal display device 2, only a design change is required where TFTs 31 that are required to apply voltage are left and the other TFTs are removed. Thereby, while man-hours to delete the TFTs 31 are required for the liquid crystal display device 2, it is possible to save design resources, reduce the number of masks whose designs are changed, and reduce design cost. As a result, the liquid crystal display device 2 can be manufactured at low cost.

In the present embodiment, a case is described where the screen of the liquid crystal display panel 12 is divided into the first to the third areas. However, the division of the screen of the liquid crystal display panel 12 is not limited to this, but a division into n (n≥2) areas may be performed. The same goes for the other embodiments described below.

Third Embodiment

Further another embodiment of the present invention will be described below with reference to the drawings. For convenience of description, members having the same functions as those of members described in the above embodiments are denoted by the same reference signs and the description thereof will be omitted.

(Overview of Liquid Crystal Display Device 3)

A liquid crystal display device 3 (see FIG. 6) of the present embodiment includes a liquid crystal display panel 13 instead of the liquid crystal display panel 12 of the liquid crystal display device 2.

(Configuration of Liquid Crystal Display Panel 13)

Figure 11:
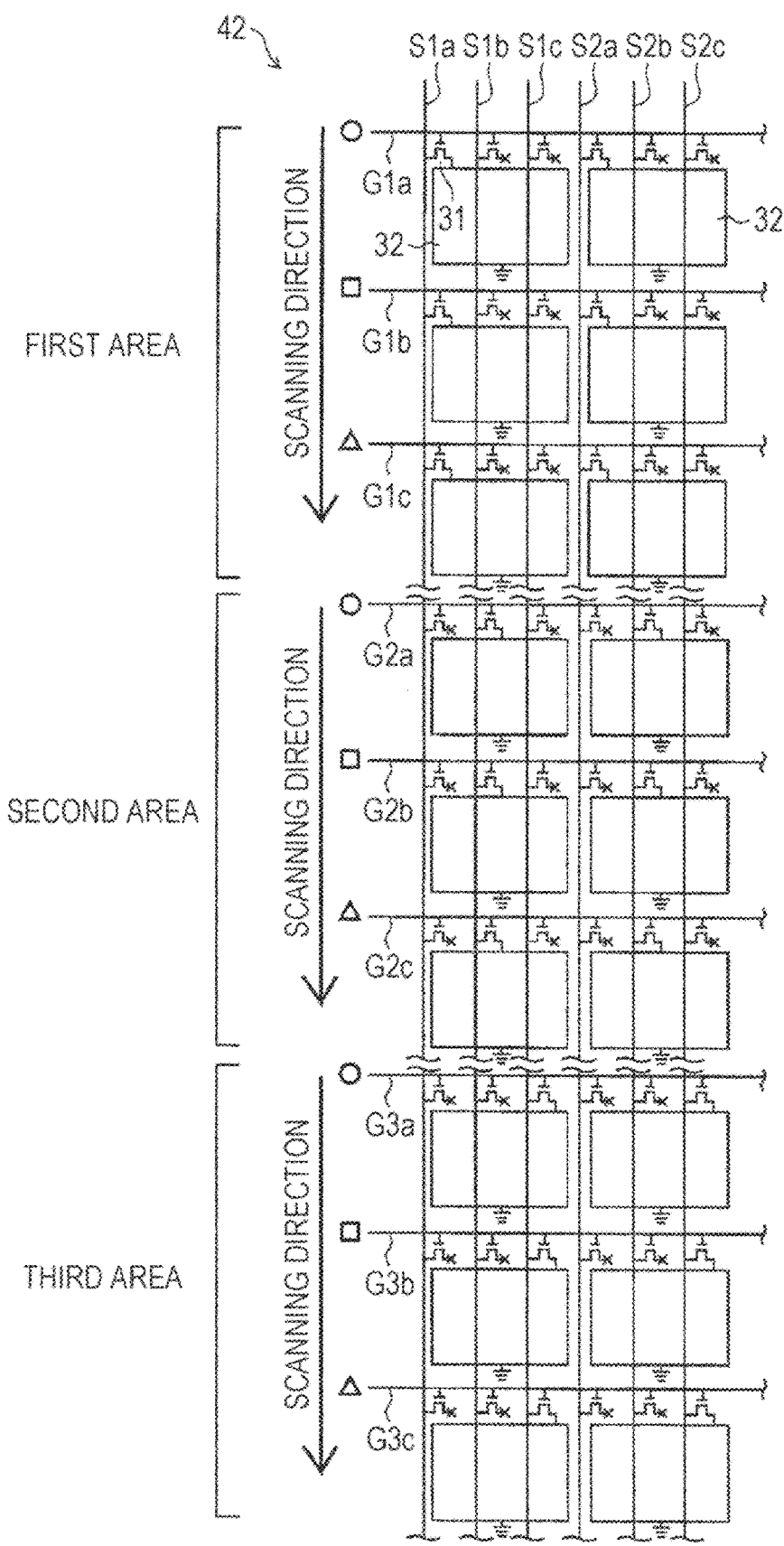
FIG. 11 is a schematic circuit diagram showing a configuration of a TFT substrate included in a liquid crystal display panel of a liquid crystal display device of further another embodiment of the present invention.

FIG. 11 is a schematic circuit diagram showing a configuration of a TFT substrate 42 included in the liquid crystal display panel 13. The TFT substrate (active matrix substrate) 42 is designed by using a design of a conventional TFT substrate of a liquid crystal display panel including a color filter in the same manner as the TFT substrate 21. In the conventional TFT substrate, each pixel included in each row is divided into three sub-pixels for red, green, and blue.

In the same manner as the TFT substrate 21, the TFT substrate 42 has source signal lines S1a to S1c, S2a to S2c, and so on, which are first to third source signal lines corresponding to the three sub-pixels for red, green, and blue, respectively. The other components on a circuit of the TFT substrate 42 are the same as those of the TFT substrate 41 of the liquid crystal display panel 12.

(Substantive Configuration of TFT Substrate 42)

Figure 12:
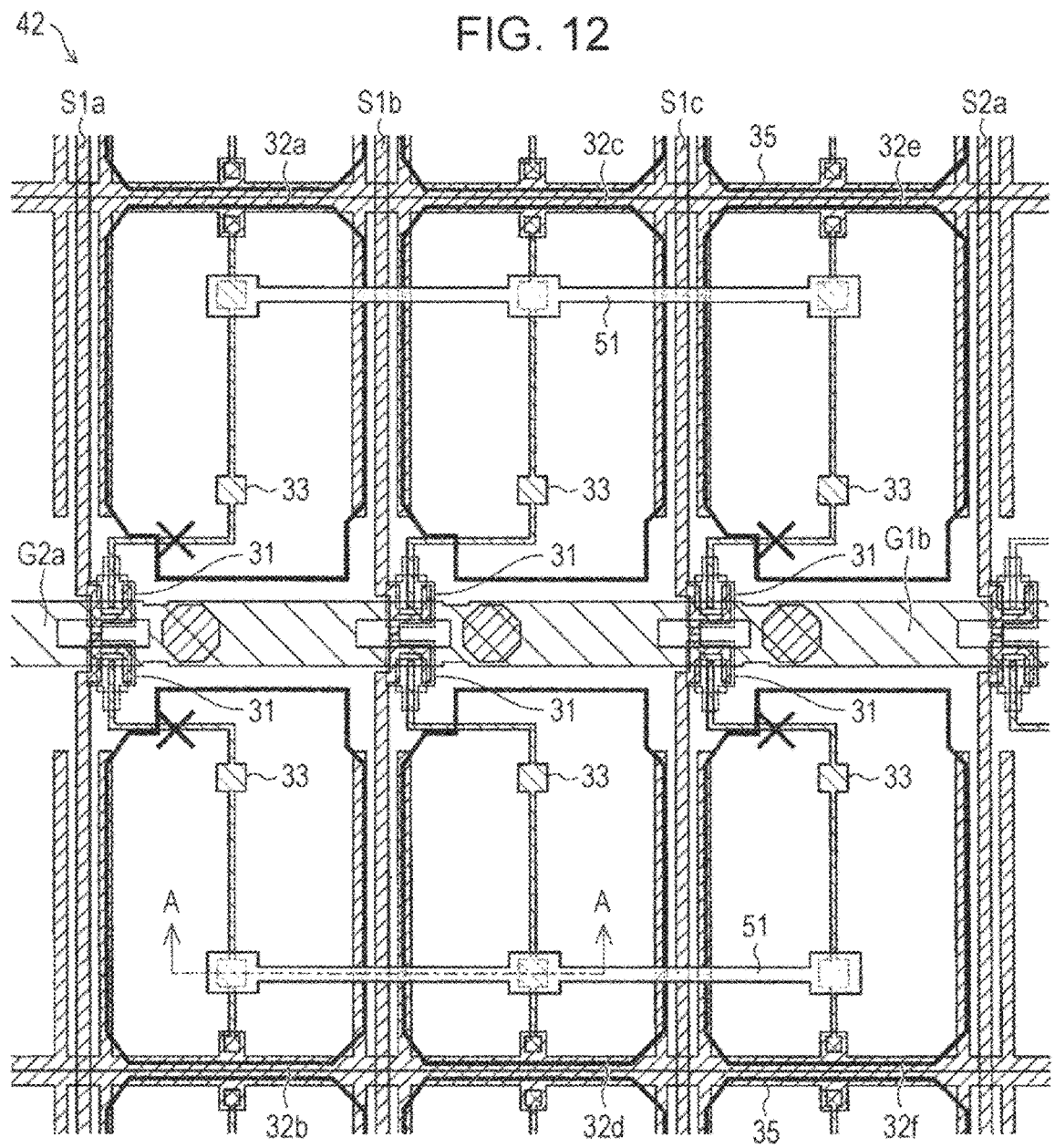
FIG. 12 is a plan view showing an example of a substantive configuration of the TFT substrate shown in FIG. 11.
Figure 13:
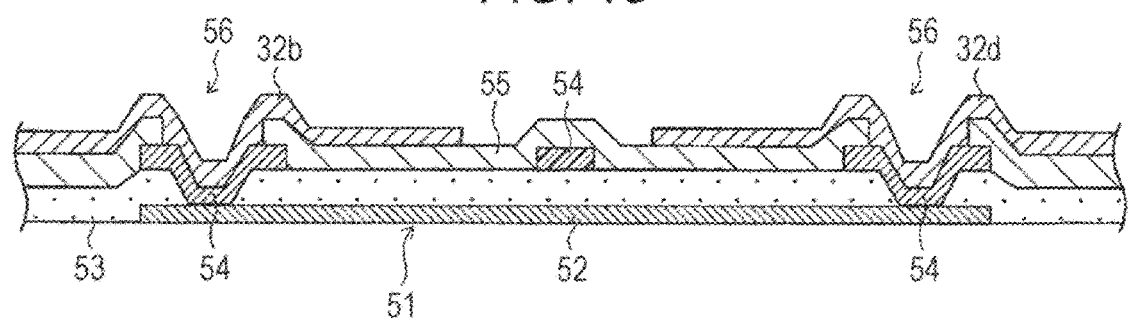
FIG. 13 is a cross-sectional view taken along arrows A-A in FIG. 12.
Figure 14:
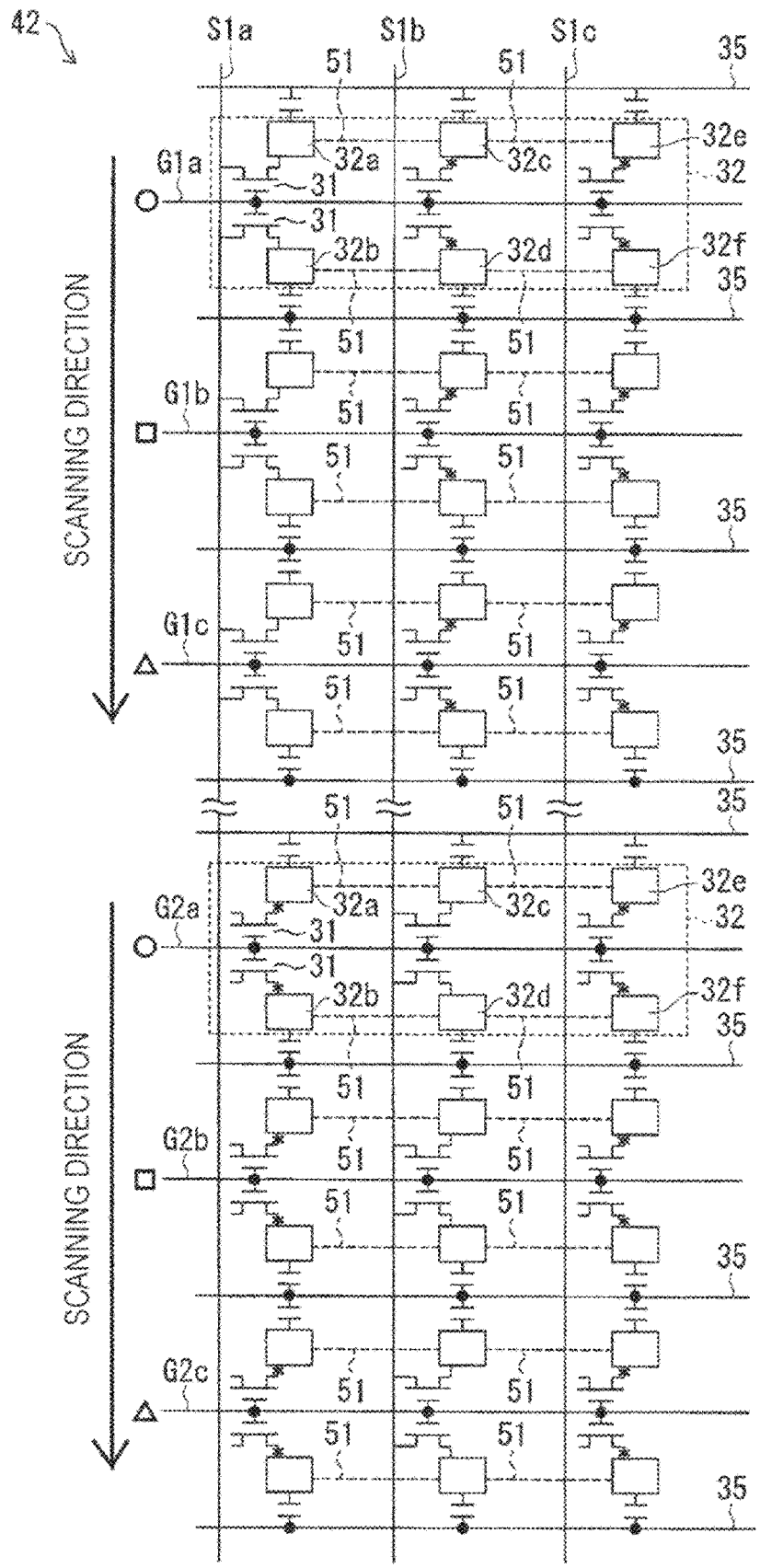
FIG. 14 is a circuit diagram corresponding to the circuit diagram of the TFT substrate shown in FIG. 11 based on the configuration shown in FIG. 12.
Figure 15:
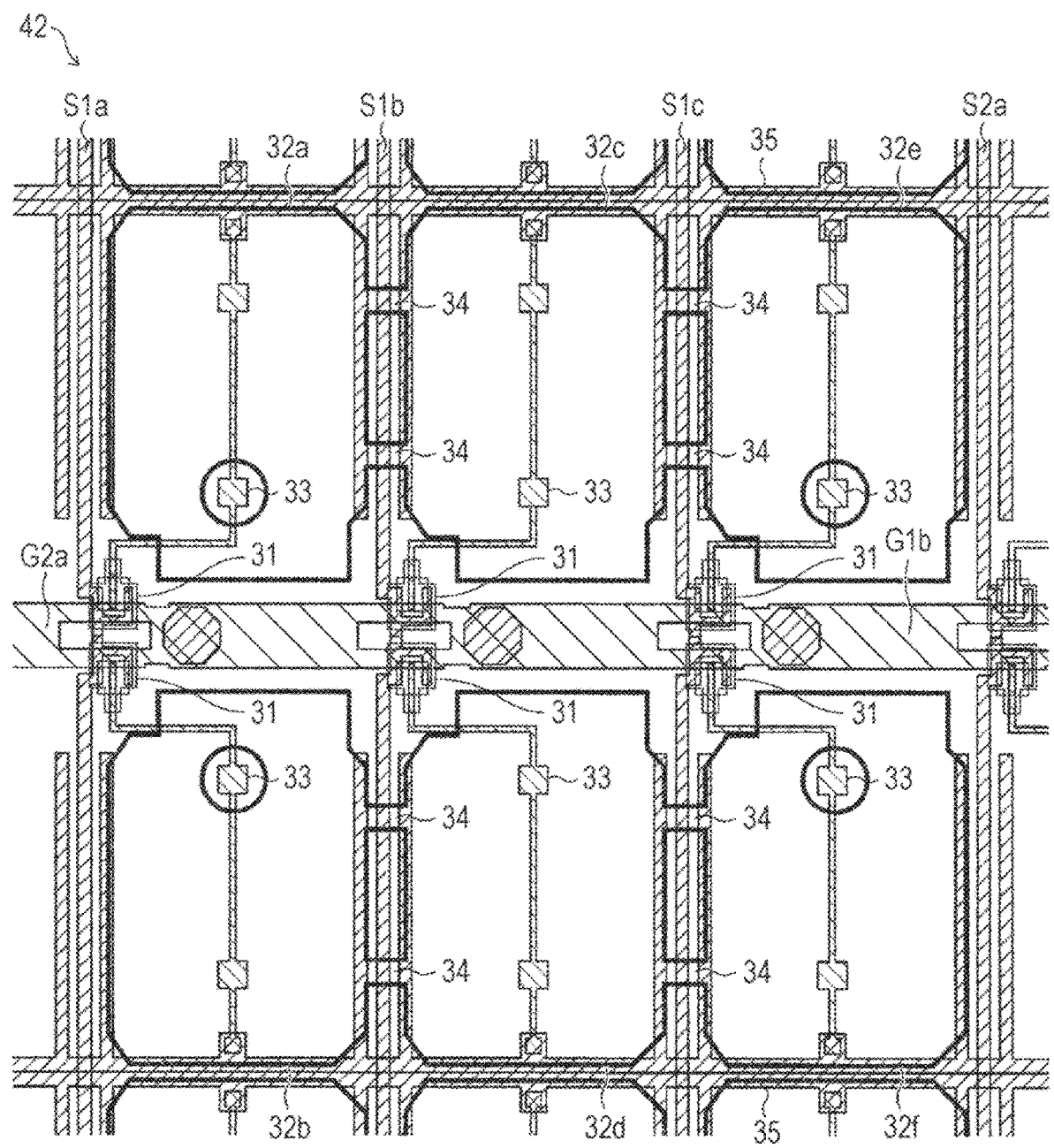
FIG. 15 is a plan view showing an example of another substantive configuration of the TFT substrate shown in FIG. 11.

Next, a substantive configuration of the TFT substrate 42 shown in FIG. 11 will be described with reference to FIGS. 12 and 13. FIG. 12 is a plan view showing an example of the substantive configuration of the TFT substrate 42 shown in FIG. 11. FIG. 13 is a cross-sectional view taken along arrows A-A in FIG. 12. FIG. 14 is a circuit diagram corresponding to the circuit diagram of the TFT substrate 42 shown in FIG. 11 based on the configuration shown in FIG. 12. FIG. 15 is a plan view showing an example of another substantive configuration of the TFT substrate 42 shown in FIG. 11. The configuration shown in FIG. 12 corresponds to a portion of the pixel electrode 32 in the first row on the left side column in the second area in FIG. 11.

As shown in FIG. 12, the TFT substrate 42 has the ITO electrodes 32a to 32f forming one pixel electrode 32 in the same manner as the TFT substrate 21. The configuration of the pixel electrode 32 is the same as that of the TFT substrate 21.

In the TFT substrate 42, a connection between the ITO electrode 32c and its left and right ITO electrodes 32a and 32e and a connection between the ITO electrode 32d and its left and right ITO electrodes 32b and 32f are performed by inter-electrode connection portion 51 instead of the inter-electrode connection portions 34.

The inter-electrode connection portion 51 has a configuration shown in FIG. 13. FIG. 13 shows a connection portion between the ITO electrode 32b and the ITO electrode 32d of the inter-electrode connection portion 51. As shown in FIG. 13, the TFT substrate 42 has, from bottom to top, a gate layer 52, an interlayer insulating film 53, a source layer 54, a final protective film 55, and the ITO electrodes 32b and 32d. The ITO electrode 32b and the ITO electrode 32d are connected to each other in contact holes 56 through the source layer 54 and the gate layer 52. Therefore, in the example of FIG. 13, the inter-electrode connection portion 51 connects the ITO electrode 32b and the ITO electrode 32d by the gate layer 52, the source layer 54, and the contact holes 56.

The interlayer insulating film 53 and the final protective film 55 are composed of, for example, SiN. The gate layer 52 and the source layer 54 are composed of a metal.

The TFT 31 and the pixel electrode 32 are connected by the contact hole 33. In the example shown in FIG. 12, in the same manner as in FIG. 4, only the ITO electrodes 32c and 32d are in a connection state with the TFT 31.

In the example of FIG. 12, the non-connection state between the TFT 31 and the pixel electrode 32 is realized by disconnecting the source electrode (or the drain electrode) of the TFT 31 between the TFT 31 and the contact hole 33. In this case, it is possible to easily cope with the presence or absence of voltage application to the ITO electrode by only changing a pattern of the source electrode (or the drain electrode).

Next, a connection relationship among the source signal lines S, the gate signal lines G, the TFTs 31, and the ITO electrodes (sub-pixel electrodes) 32 described above will be described in more detail with reference to FIG. 14.

As shown in FIG. 14, in the TFT substrate 42 using a conventional design, the TFT 31 is formed for all the sub-pixels.

Among the TFTs 31 connected to the gate signal line G1*a*, two TFTs 31 whose original purpose is to transmit a signal of the source signal line S1*a* to the ITO electrodes (sub-pixel electrodes) 32*a* and 32*b* accomplish the original purpose (the two TFTs 31 are used according to the original purpose). Specifically, regarding the two TFTs 31, the source electrode is connected to the source signal line S1*a*, and the drain electrode is connected to the ITO electrode 32*a* or 32*b*.

On the other hand, among the TFTs 31 connected to the gate signal line G1*a*, two TFTs 31 whose original purpose is to transmit a signal of the source signal line S1*b* to the ITO electrodes (sub-pixel electrodes) 32*c* and 32*d* and two TFTs 31 whose original purpose is to transmit a signal of the source signal line S1*c* to the ITO electrodes (sub-pixel electrodes) 32*e* and 32*f* do not accomplish the original purpose (the four TFTs 31 are not used according to the original purpose). Specifically, regarding the two TFTs 31 whose original purpose is to transmit a signal of the source signal line S1*b* to the ITO electrodes (sub-pixel electrodes) 32*c* and 32*d*, the source electrodes are disconnected from the source signal line S1*b* and the drain electrodes are disconnected from the ITO electrodes 32*c* or 32*d*. Similarly, regarding the two TFTs 31 whose original purpose is to transmit a signal of the source signal line S1*c* to the ITO electrodes (sub-pixel electrodes) 32*e* and 32*f*, the source electrodes are disconnected from the source signal line S1*c* and the drain electrodes are disconnected from the ITO electrodes 32*e* or 32*f*.

A connection relationship among the source signal lines S1*a* to S1*c*, the gate signal lines G1*b* and G1*c*, the TFTs 31, and the ITO electrodes (sub-pixel electrodes) 32 are the same as the connection relationship among the source signal lines S1*a* to S1*c*, the gate signal line G1*a*, the TFTs 31, and the ITO electrodes (sub-pixel electrodes) 32 described above. In the first area, the connection relationship described above is repeated in the gate signal lines G1*a*, G1*b*, and G1*c* and so on.

In the first area, as described above, the TFT 31 that accomplishes the original purpose of transmitting a signal of the source signal line S to the ITO electrodes (sub-pixel electrodes) 32 (the TFT that is used according to the original purpose) is only the TFT 31 connected to the source signal line S1*a*. On the other hand, in the second area, the TFT 31 that accomplishes the original purpose is only the TFT 31 connected to the source signal line S1*b*, and in the third area, the TFT 31 that accomplishes the original purpose is only the TFT 31 connected to the source signal line S1*c*.

In the TFT substrate 42, the non-connection state between the TFT 31 and the pixel electrode 32 may be realized by eliminating a pattern of the ITO electrode in the contact hole 33 surrounded by a circle as shown in FIG. 15. In this case, it is possible to easily cope with the presence or absence of voltage application to the ITO electrode by only changing the pattern of the ITO electrode. In the example of FIG. 15, adjacent ITO electrodes are connected by the inter-electrode connection portions 34. However, of course, the adjacent ITO electrodes may be connected by the inter-electrode connection portion 51.

(Operation and Advantage of Liquid Crystal Display Device 3)

In the configuration described above, an operation of the liquid crystal display device 3 is the same as that of the liquid crystal display device 2.

The inter-electrode connection portion 51 included in the TFT substrate 42 connects the ITO electrodes 32*a*, 32*c*, and 32*e* together and connects the ITO electrodes 32*b*, 32*d*, and 32*f* together by using the gate layer 52 and the source layer 54. In this case, the inter-electrode connection portion 51 crosses the source signal line S in a non-connection state.

In the inter-electrode connection portion 51, the gate layer 52 crosses (goes under) the source signal line S, and the gate layer 52 is composed of a metal such as aluminum, whose resistance is lower than that of ITO. Therefore, the gate layer 52 can sufficiently pass charges even when its line width is reduced, and a pixel can be charged. Thereby, it is possible to reduce parasitic capacitance by reducing an overlap area between the gate layer 52 and the source signal line S as compared with a case where the inter-electrode connection portions 34 that use ITO are provided. As a result, it is possible to further suppress potential variation of the source signal, that is, potential variation of the pixel electrode 32.

A configuration where adjacent ITO electrodes are connected by the inter-electrode connection portion 51 can also be applied to liquid crystal display devices of all the other embodiments in the same manner.

The other advantages of the liquid crystal display device 3 are the same as those of the liquid crystal display device 2.

Fourth Embodiment

Further another embodiment of the present invention will be described below with reference to the drawings. For convenience of description, members having the same functions as those of members described in the above embodiments are denoted by the same reference signs and the description thereof will be omitted.

(Overview of Liquid Crystal Display Device 4)

A liquid crystal display device 4 (see FIG. 6) of the present embodiment includes the same liquid crystal display panel 12 (the TFT substrate 41) as the liquid crystal display panel 12 (the TFT substrate 41) of the liquid crystal display device 2.

(Configuration of Liquid Crystal Display Device 4)

Figure 16:
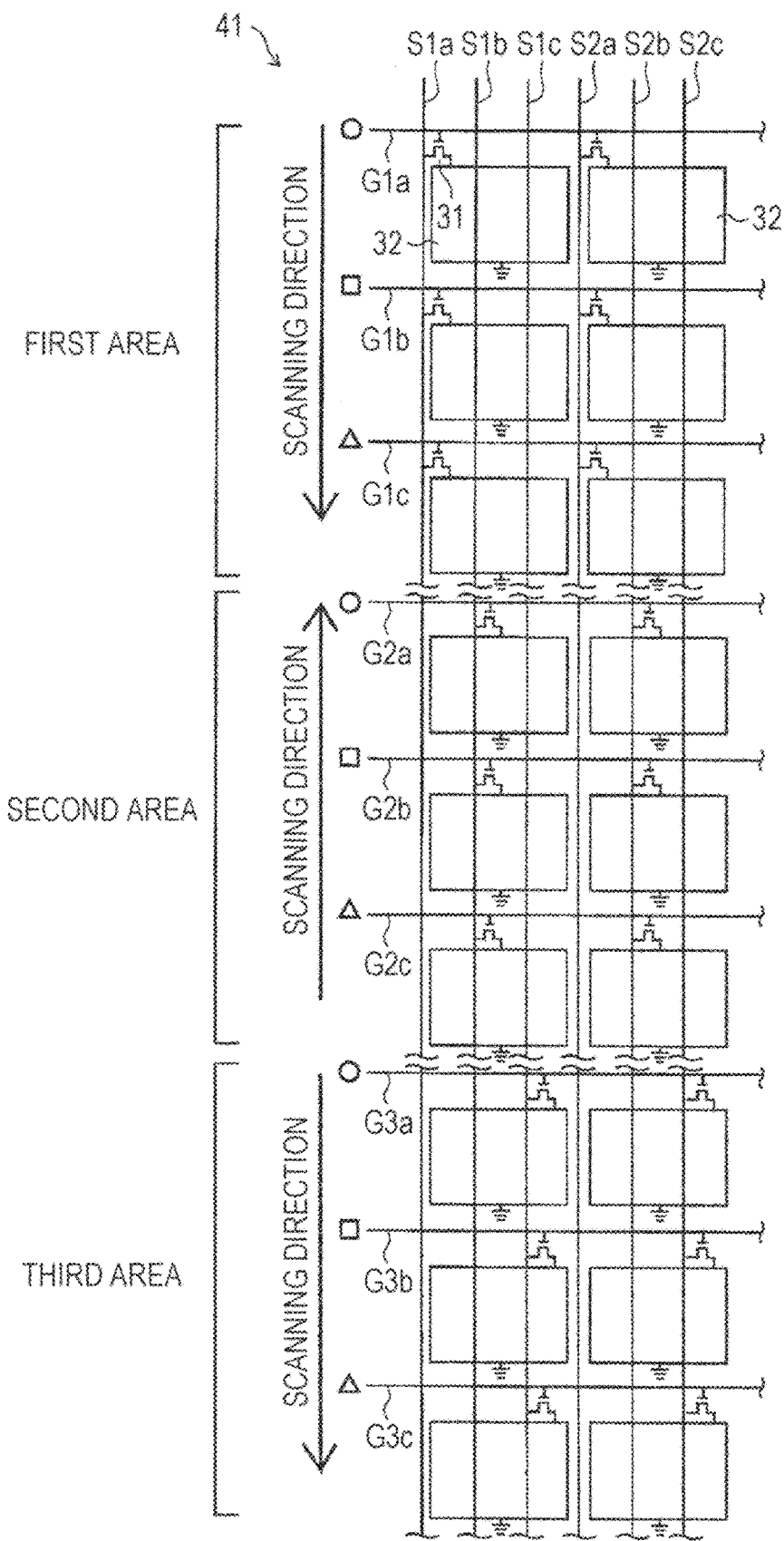
FIG. 16 is a schematic circuit diagram showing a configuration of a TFT substrate included in a liquid crystal display panel of a liquid crystal display device of further another embodiment of the present invention.
Figure 17:
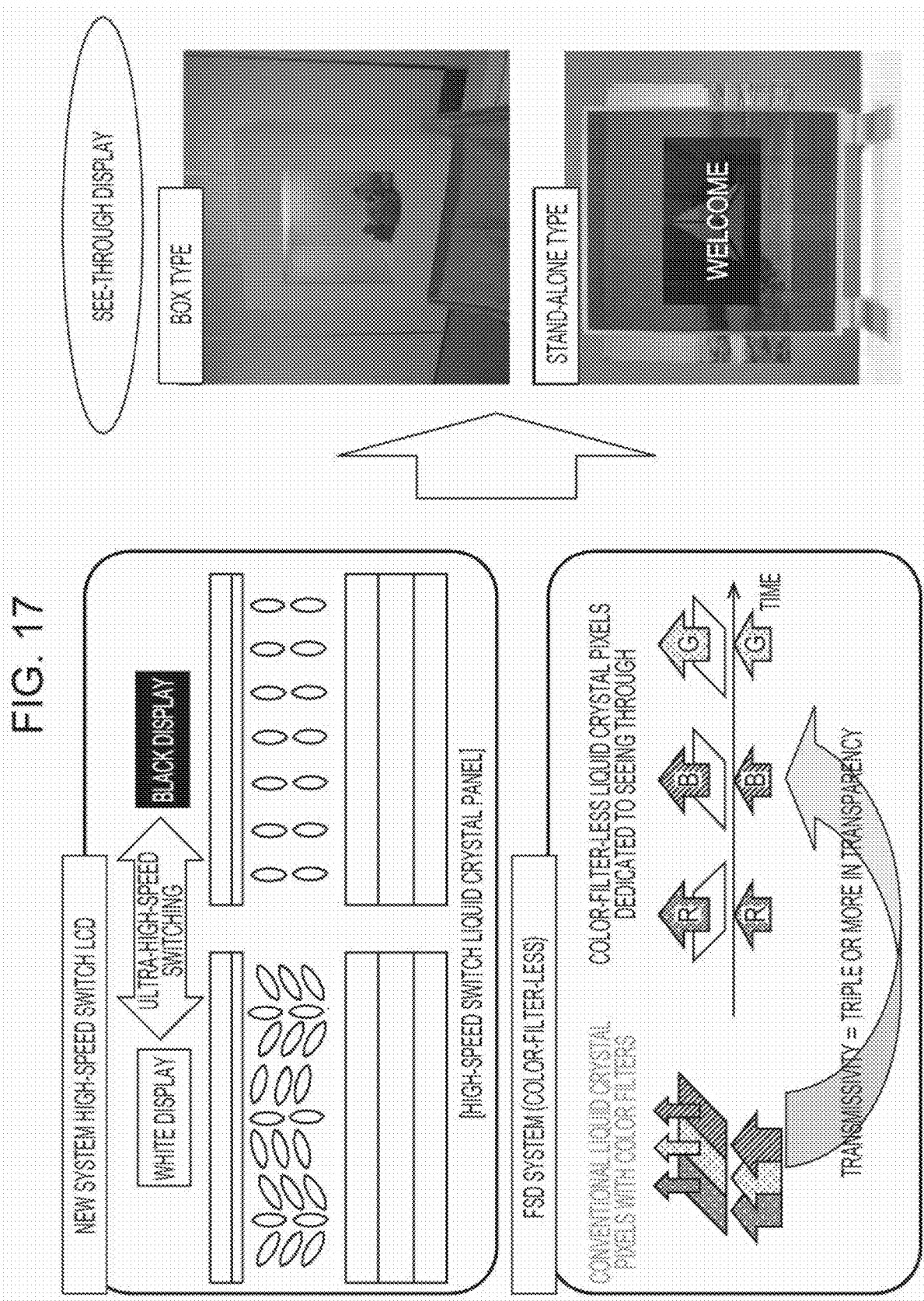
FIG. 17 is an explanatory diagram showing that transmissivity of FSD (Field Sequential Display) without color filter and transmissivity of a liquid crystal display with color filter are compared and the transmissivity of the latter is low.
Figure 18:
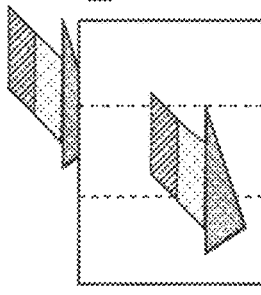
FIG. 18 is an explanatory diagram showing advantage and disadvantage of an FSC (Field Sequential Color) method used for a time-division driving type liquid crystal display device with respect to a CF method.
Figure 19:
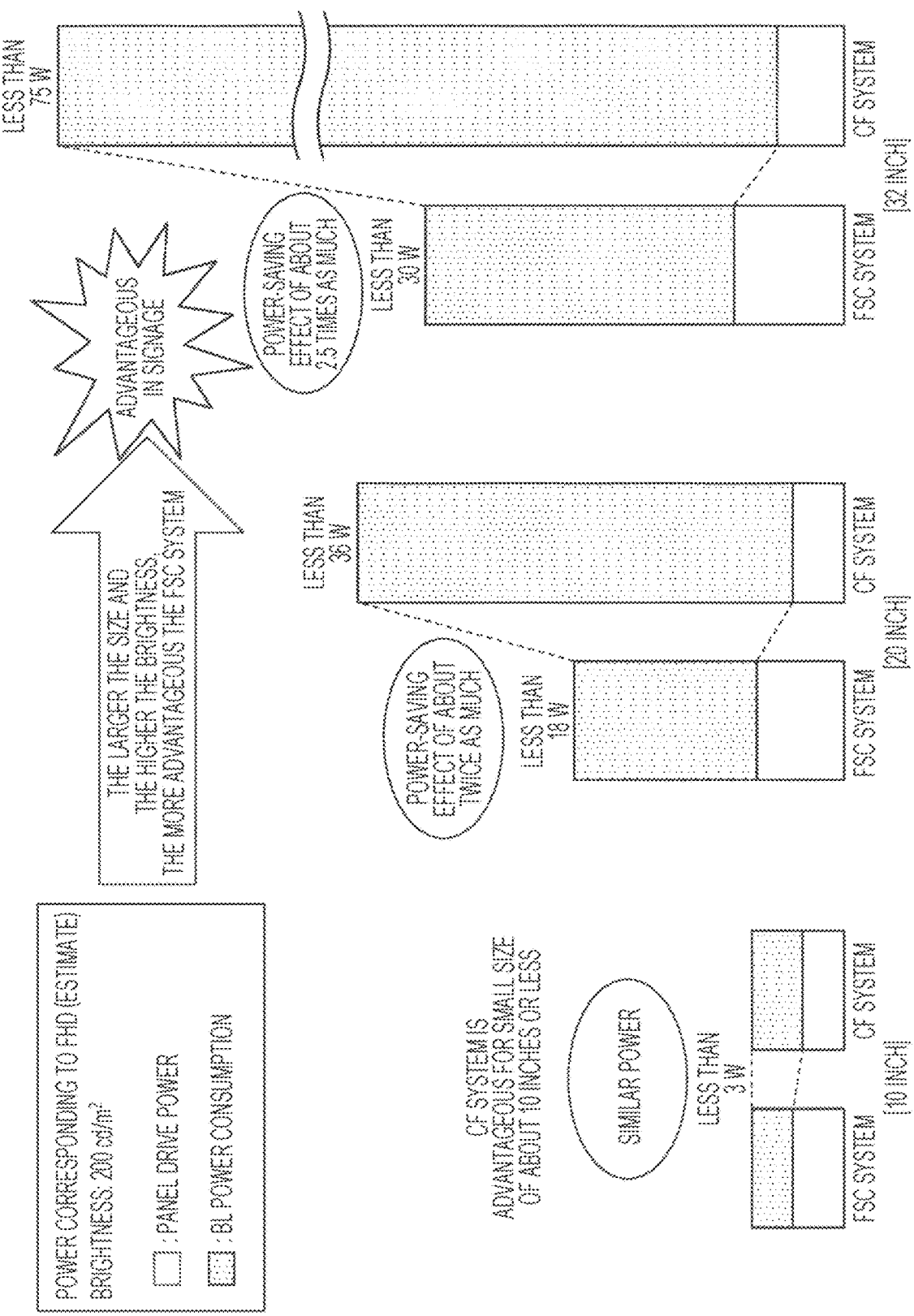
FIG. 19 is an explanatory diagram showing power consumption of the FSC (Field Sequential Color) method and the CF method.
Figure 20:
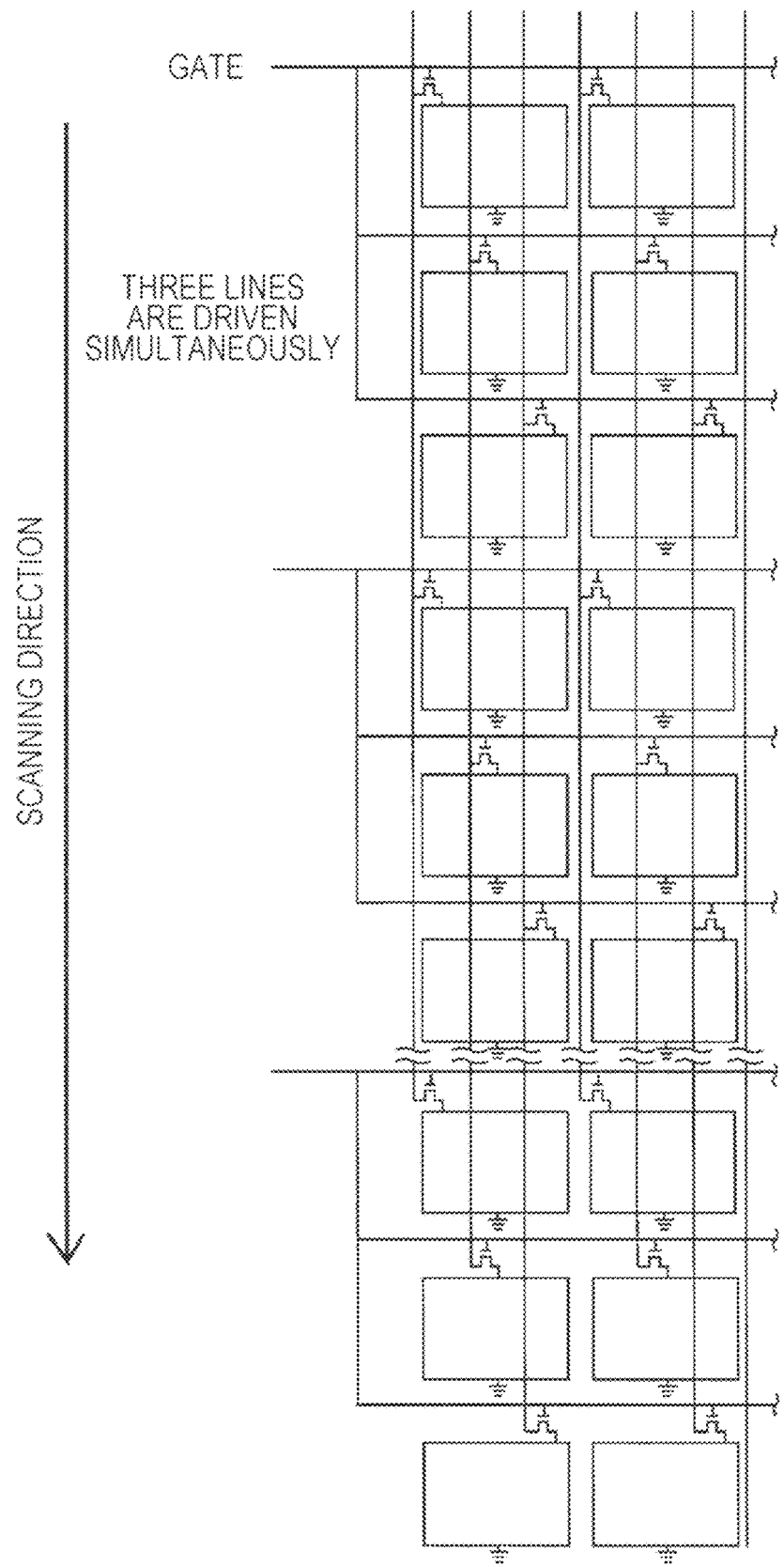
FIG. 20 is a circuit diagram showing a configuration of a TFT substrate of a liquid crystal display device described in PTL1.

FIG. 16 is an explanatory diagram showing a schematic circuit of the TFT substrate 41 included in the liquid crystal display device 4 and a scanning direction by each of the gate drivers GD1 to GD3 (see FIG. 6).

In the liquid crystal display device 4, as shown in FIG. 16, the gate driver GD1 scans the first area from top to bottom, the gate driver GD2 scans the second area from bottom to top, and the gate driver GD3 scans the third area from top to bottom. The other constitution of the liquid crystal display device 4 is the same as that of the liquid crystal display device 2.

(Operation and Advantage of Liquid Crystal Display Device 4)

In the configuration described above, an operation of the liquid crystal display device 4 is the same as that of the liquid crystal display device 2 except that the scanning direction of the gate driver GD2 is different from the scanning direction of the gate driver GD2 of the liquid crystal display device 2.

Here, in general, in a time-division driving liquid crystal display device, while a sufficient response time is given to the liquid crystal layer 23 for a pixel scanned first, a sufficient response time is not given to the liquid crystal layer 23 for a pixel scanned last, and the backlight is turned on in this state. As a result, a luminance difference occurs between the pixel scanned first and the pixel scanned last.

In the liquid crystal display device 4, the scanning of the first area by the gate driver GD1 is performed from top to bottom of the first area, the scanning of the second area by the gate driver GD2 is performed from bottom to top of the second area, and the scanning of the third area by the gate driver GD3 is performed from top to bottom of the third area. Therefore, the lowermost pixel in the first area and the uppermost pixel in the second area, which are adjacent to each other, are scanned last. The lowermost pixel in the second area and the uppermost pixel in the third area, which are adjacent to each other, are scanned first. In this way, in the liquid crystal display device 4, pixels adjacent between the first and the second areas are scanned at the same time, and pixels adjacent between the second and the third areas are scanned at the same time.

Thereby, luminance difference hardly occurs between the lowermost pixel in the first area and the uppermost pixel in the second area, which are adjacent to each other and between the lowermost pixel in the second area and the uppermost pixel in the third area, which are adjacent to each other. As a result, the liquid crystal display device 4 can perform an excellent display with less luminance unevenness. The other advantages of the liquid crystal display device 4 are the same as those of the liquid crystal display device 2.

According to the configuration of the embodiment, it is possible to realize a time-division driving type liquid crystal display device at low cost and minimum man-hours, and a large-sized transparent display can be realized.

For the TFT substrates 21, 41, and 42 shown in FIGS. 5, 9, and 14, a TFT substrate used for a so-called MPD (Multi-Pixel Driving) can be used. In a configuration using the MPD, at least two sub-pixel electrodes are provided to one sub-pixel. The two sub-pixel electrodes are connected to the same data signal line and the same scanning signal line through different transistors. Further, a first CS wiring line (a holding capacitance wiring line) that forms a capacitance with one of the two sub-pixel electrodes and a second CS wiring line that forms a capacitance with the other sub-pixel electrode are provided. CS signals (modulation signals) with different phases are supplied to the first and the second CS wiring lines. Thereby, a bright area and a dark area can be formed in a sub-pixel that displays halftone (for example, a sub-pixel that displays red, green, or blue), so that it is possible to improve view angle characteristics and detail-clarity.

CONCLUSION

A liquid crystal display device according to an aspect 1 of the present invention includes the liquid crystal display panel 12 or 13 having an active matrix substrate (the TFT substrate 41 or 42), and the backlight device 19. The backlight device 19 emits at least red, green, and blue lights in a time division manner from its entire surface and a display of the liquid crystal display panel 12 or 13 is switched in synchronization with the light emission, and thereby the liquid crystal display device performs color display. In the liquid crystal display device, one pixel is divided into three sub-pixels by source signal lines S, there is a sub-pixel electrode for each of the three sub-pixels, a plurality of the sub-pixel electrodes corresponding to the one pixel are connected together by inter-electrode connection portions 34 or 51 that cross the source signal lines in a non-connection state to form one pixel electrode 32, one switching element (TFT 31) is connected to the pixel electrode 32 so that a voltage can be applied from the source signal line S to the pixel electrode 32, a screen of the liquid crystal display panel 12 or 13 is divided into n (n≥2) areas (first to third areas) in an arrangement direction of gate signal lines G, the gate signal lines of each divided area are scanned simultaneously one line at a time in each divided area, and the backlight device 19 emits light after completion of the scanning of the gate signal lines in each divided area.

According to the above configuration, it is possible to use a design of an existing liquid crystal display panel that uses a color filter for a design of the liquid crystal display panels 12 and 13 of the liquid crystal display device. Thereby, the liquid crystal display device can save design resources, reduce the number of masks whose designs are changed, and reduce design cost. As a result, it is possible to manufacture the liquid crystal display device at low cost.

Further, the screen of the liquid crystal display panel 12 or 13 is divided into n (n≥2) areas in the arrangement direction of gate signal lines G, and the gate signal lines G of each divided area are scanned simultaneously one line at a time in each divided area. Thereby, it is possible to reduce loads of the gate drivers and the source driver by lowering a drive frequency to 1/n.

In the aspect 1 described above, a liquid crystal display device according to an aspect 2 of the present invention may have a configuration where only one sub-pixel of the three sub-pixels has the switching element (TFT 31).

According to the above configuration, it is possible to easily manufacture the liquid crystal display device by leaving a switching element of the only one sub-pixel of the three sub-pixels and removing switching elements of the other sub-pixels by using a design of a conventional liquid crystal display device.

In the aspect 1 described above, a liquid crystal display device according to an aspect 3 of the present invention may have a configuration where each of the three sub-pixels has a switching element (TFT 31), and only one of the switching elements of the three sub-pixels is connected to the pixel electrode 32 so that a voltage can be applied from the source signal line S.

According to the above configuration, it is possible to easily manufacture the liquid crystal display device by connecting only one of the switching elements respectively included in the three sub-pixels to the pixel electrode 32 so that a voltage can be applied from the source signal line S by using a design of a conventional liquid crystal display device.

In any one of the aspects 1 to 3 described above, a liquid crystal display device according to an aspect 4 of the present invention may have a configuration where the gate signal line G of a scanning starting end in each divided area is the gate signal line G at an end portion on an identical side in an arrangement direction of the gate signal lines G.

According to the above configuration, the gate signal line G of the scanning starting end in each divided area may be the gate signal line G at the end portion on the identical side in the arrangement direction of the gate signal lines G.

Thereby, it is possible to apply a conventional configuration where each divided area is scanned by each gate driver GD corresponding to the divided area.

In any one of the aspects 1 to 3 described above, a liquid crystal display device according to an aspect 5 of the present invention may have a configuration where the gate signal line G of a scanning starting end in each divided area (each of the first to the third areas) is the gate signal line on one end side in an arrangement direction of the gate signal lines G in one of the divided areas adjacent to each other (the first and second areas, and the second and third areas) and the gate signal line on the other end side in the arrangement direction of the gate signal lines in the other divided area.

According to the above configuration, the gate signal line G of the scanning starting end in each divided area is the gate signal line on one end side in the arrangement direction of the gate signal lines G in one of the divided areas adjacent to each other and the gate signal line on the other end side in the arrangement direction of the gate signal lines in the other divided area. Therefore, for example, even if a sufficient response time is not given to a liquid crystal layer of a pixel corresponding to an end gate signal line G, luminance difference hardly occurs between the above pixel and a pixel at an end portion of another divided area adjacent to the above pixel. Thereby, the liquid crystal display device can perform an excellent display with less luminance unevenness.

A liquid crystal display device according to an aspect 6 of the present invention includes the liquid crystal display panel 11 having an active matrix substrate (the TFT substrate 21), and the backlight device 19. The backlight device 19 emits at least red, green, and blue lights in a time division manner from its entire surface and a display of the liquid crystal display panel 11 is switched in synchronization with the light emission, and thereby the liquid crystal display device performs color display. In the liquid crystal display device, one pixel is divided into three sub-pixels by source signal lines S, there are a switching element (TFT 31) and a sub-pixel electrode for each of the three sub-pixels, a plurality of the sub-pixel electrodes corresponding to the one pixel are connected together by inter-electrode connection portions 34 or 51 that cross the source signal lines S in a non-connection state to form one pixel electrode 32, and only one of a plurality of switching elements corresponding to the one pixel is connected to the pixel electrode 32 so that a voltage can be applied to the pixel electrode 32.

According to the above configuration, it is possible to use a design of an existing liquid crystal display panel that uses a color filter for a design of the liquid crystal display panel 11 of the liquid crystal display device. Thereby, the liquid crystal display device can save design resources, reduce the number of masks whose designs are changed, and reduce design cost. As a result, it is possible to manufacture the liquid crystal display device at low cost.

In the aspect 6 described above, a liquid crystal display device according to an aspect 7 of the present invention may have a configuration where m (m≥2) gate signal lines G are connected together to be one unit gate signal line and a gate voltage is applied from a gate driver GD for each one unit gate signal line.

According to the above configuration, in the liquid crystal display device, m (m≥2) gate signal lines are connected together to be one unit gate signal line and the gate voltage is applied from the gate driver GD for each one unit gate signal line. Thereby, it is possible to reduce load of the source driver SD by lowering the drive frequency to 1/n.

In any one of the aspects 1, 3, 6, and 7 described above, a liquid crystal display device according to an aspect 8 of the present invention may have a configuration where a drain electrode or a source electrode of switching elements (TFTs 31) other than the switching element (TFT 31) that is connected to the pixel electrode 32 so that a voltage can be applied to the pixel electrode 32 is disconnected.

According to the above configuration, a drain electrode or a source electrode of switching elements (TFTs 31) other than the switching element (TFT 31) that is connected to the pixel electrode 32 so that a voltage can be applied to the pixel electrode 32 is disconnected and the switching elements are disconnected from the pixel electrode, so that it is possible to easily use a design of a conventional liquid crystal display device that has a switching element for each of the three sub-pixels.

In any one of the aspects 1, 3, 6, and 7 described above, a liquid crystal display device according to an aspect 9 of the present invention may have a configuration where the switching element (TFT 31) for voltage application that is connected to the pixel electrode 32 so that a voltage can be applied to the pixel electrode 32 is connected to the pixel electrode 32 by a contact hole 33, and a portion of the contact hole 33 of the pixel electrode 32 is removed from switching elements other than the switching element for voltage application, so that the switching elements are disconnected from the pixel electrode.

According to the above configuration, the portion of the contact hole 33 of the pixel electrode 32 is removed from switching elements other than the switching element for voltage application, and the switching elements 32 are disconnected from the pixel electrode, so that it is possible to easily use a design of a conventional liquid crystal display device that has a switching element for each of the three sub-pixels.

In any one of the aspects 1 to 9 described above, a liquid crystal display device according to an aspect 10 of the present invention may have a configuration where the inter-electrode connection portion 51 includes a gate layer 52 that crosses the source signal line S in a non-connection state.

According to the above configuration, the inter-electrode connection portion 51 includes the gate layer 52 that crosses the source signal line S in a non-connection state. Specifically, a plurality of the sub-pixel electrodes corresponding to one pixel are connected together by the inter-electrode connection portion 51 including the gate layer 52 that crosses the source signal lines S in a non-connection state to form one pixel electrode 32.

The gate layer 52 is composed of a metal such as aluminum, whose resistance is lower than that of ITO, so that the gate layer 52 can sufficiently pass charges even when its line width is reduced, and a pixel can be charged. Thereby, it is possible to reduce parasitic capacitance by reducing an overlap area between the gate layer 52 and the source signal line S as compared with a case where ITO is used for the inter-electrode connection portion 51, and it is possible to suppress potential variation of the source signal, that is, potential variation of the pixel electrode 32.

In any one of the aspects 1 to 5 described above, a liquid crystal display device according to an aspect 11 of the present invention may have a configuration where gate drivers GD1 to GD3 composed of Chip On Film are included for each of the n areas, and in a film on which the gate drivers GD1 to GD3 are mounted, a wiring pattern where a start pulse inputted into a gate driver on a start side is sequentially sent to a gate driver on an end side is modified to a wiring pattern where start pulses can be inputted into the gate drivers GD1 to GD3 in parallel.

According to the above configuration, it is possible to easily form a Chip On Film where the gate drivers GD1 to GD3 are mounted by using a conventional configuration having a wiring pattern where a start pulse inputted into a gate driver on a start side is sequentially sent to a gate driver on an end side.

The present invention is not limited to the embodiments described above, but can be variously modified within the scope of the claims. An embodiment obtained by appropriately combining technical means disclosed in different embodiments is also included in the technical scope of the present invention. Further, it is possible to form novel technical features by combining the technical means disclosed respectively in the embodiments.

REFERENCE SIGNS LIST 1 to 4 LIQUID CRYSTAL DISPLAY DEVICE
11 to 13 LIQUID CRYSTAL DISPLAY PANEL
18 DISPLAY CONTROL CIRCUIT
19 BACKLIGHT DEVICE
21, 41, 42 TFT SUBSTRATE (ACTIVE MATRIX SUBSTRATE)
22 COUNTER SUBSTRATE
31 TFT (SWITCHING ELEMENT)
32 PIXEL ELECTRODE
32a to 32f ITO ELECTRODE
33 CONTACT HOLE
34, 51 INTER-ELECTRODE CONNECTION PORTION
35 CS LINE
S1a to S1c SOURCE SIGNAL LINE
G1a to G1c GATE SIGNAL LINE
SD SOURCE DRIVER
GD, GD1 to GD3 GATE DRIVER

The invention claimed is:

1. A liquid crystal display device comprising:
a liquid crystal display panel having an active matrix substrate; and
a backlight device, wherein
the backlight device emits at least red, green, and blue lights in a time division manner from its entire surface and a display of the liquid crystal display panel is switched in synchronization with the light emission, so that the liquid crystal display device performs color display, wherein
one pixel is divided into three sub-pixels by source signal lines,
there is a sub-pixel electrode for each of the three sub-pixels,
a plurality of the sub-pixel electrodes corresponding to the one pixel are connected together by inter-electrode connection portions that cross the source signal lines in a non-connection state to form one pixel electrode,
one switching element is connected to the pixel electrode so that a voltage can be applied from the source signal line to the pixel electrode,
a screen of the liquid crystal display panel is divided into n (n≥2) areas in an arrangement direction of gate signal lines,
the gate signal lines of each divided area are scanned simultaneously one line at a time in each divided area,
the backlight device emits light after completion of the scanning of the gate signal lines in each divided area, and the switching element for voltage application that is connected to the pixel electrode so that a voltage can be applied to the pixel electrode is connected to the pixel electrode by a contact hole, and a portion of the contact hole of the pixel electrode is removed from switching elements other than the switching element for voltage application, so that the switching elements are disconnected from the pixel electrode.

2. The liquid crystal display device according to claim 1, wherein
only one sub-pixel of the three sub-pixels has the switching element.

3. The liquid crystal display device according to claim 1, wherein
each of the three sub-pixels has a switching element, and
only one of the switching elements of the three sub-pixels is connected to the pixel electrode so that a voltage can be applied from the source signal line.

4. The liquid crystal display device according to claim 1, wherein
the gate signal line of a scanning starting end in each divided area is the gate signal line at an end portion on an identical side in an arrangement direction of the gate signal lines.

5. The liquid crystal display device according to claim 1, wherein
the gate signal line of a scanning starting end in each divided area is the gate signal line on one end side in an arrangement direction of the gate signal lines in one of the divided areas adjacent to each other and the gate signal line on the other end side in the arrangement direction of the gate signal lines in the other divided area.

6. A liquid crystal display device comprising:
a liquid crystal display panel having an active matrix substrate; and
a backlight device, wherein
the backlight device emits at least red, green, and blue lights in a time division manner from its entire surface and a display of the liquid crystal display panel is switched in synchronization with the light emission, so that the liquid crystal display device performs color display, wherein
one pixel is divided into three sub-pixels by source signal lines,
there are a switching element and a sub-pixel electrode for each of the three sub-pixels,
a plurality of the sub-pixel electrodes corresponding to the one pixel are connected together by inter-electrode connection portions that cross the source signal lines in a non-connection state to form one pixel electrode,
only one of a plurality of switching elements corresponding to the one pixel is connected to the pixel electrode so that a voltage can be applied to the pixel electrode, and
the switching element for voltage application that is connected to the pixel electrode so that a voltage can be applied to the pixel electrode is connected to the pixel electrode by a contact hole, and a portion of the contact hole of the pixel electrode is removed from switching elements other than the switching element for voltage application, so that the switching elements are disconnected from the pixel electrode.

7. The liquid crystal display device according to claim 6, wherein m (m≥2) gate signal lines are connected together to be one unit gate signal line and a gate voltage is applied from a gate driver for each one unit gate signal line.

8. The liquid crystal display device according to claim 1, wherein a drain electrode or a source electrode of switching elements other than the switching element that is connected to the pixel electrode so that a voltage can be applied to the pixel electrode is disconnected.

9. The liquid crystal display device according to claim 1, wherein the inter-electrode connection portion includes a gate layer that crosses the source signal line in a non-connection state.

10. The liquid crystal display device according to claim 6, wherein a drain electrode or a source electrode of switching elements other than the switching element that is connected to the pixel electrode so that a voltage can be applied to the pixel electrode is disconnected.

11. The liquid crystal display device according to claim 6, wherein the inter-electrode connection portion includes a gate layer that crosses the source signal line in a non-connection state.

* * * * *